(12) United States Patent
Toshinari et al.

(10) Patent No.: US 12,187,884 B2
(45) Date of Patent: Jan. 7, 2025

(54) GREASE-RESISTANT FILM, GREASE-RESISTANT BASE MATERIAL, AND GREASE-RESISTANT PAPER

(71) Applicant: KURARAY CO., LTD., Kurashiki (JP)

(72) Inventors: Kenta Toshinari, Tsukuba (JP); Yuki Fujii, Kurashiki (JP); Atsushi Inatomi, Tsukuba (JP); Akio Fujita, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 603 days.

(21) Appl. No.: 17/413,776

(22) PCT Filed: Dec. 20, 2019

(86) PCT No.: PCT/JP2019/050071
§ 371 (c)(1),
(2) Date: Jun. 14, 2021

(87) PCT Pub. No.: WO2020/130131
PCT Pub. Date: Jun. 25, 2020

(65) Prior Publication Data
US 2022/0033637 A1 Feb. 3, 2022

(30) Foreign Application Priority Data

Dec. 21, 2018 (JP) .................. 2018-240326
Sep. 17, 2019 (JP) .................. 2019-168774

(51) Int. Cl.
*C08L 29/04* (2006.01)
*C08J 5/18* (2006.01)
(Continued)

(52) U.S. Cl.
CPC .................. *C08L 29/04* (2013.01); *C08J 5/18* (2013.01); *D21H 19/22* (2013.01); *D21H 21/16* (2013.01);
(Continued)

(58) Field of Classification Search
None
See application file for complete search history.

(56) References Cited

U.S. PATENT DOCUMENTS 5,416,181 A 5/1995 Nguyen et al.
5,527,544 A 6/1996 Nguyen et al.
(Continued)

FOREIGN PATENT DOCUMENTS

CN 106574446 A 4/2017
JP 60-248763 A 12/1985
(Continued)

OTHER PUBLICATIONS

JP 2014-218755 A1, machine translation (Year: 2014).*
(Continued)

*Primary Examiner* — Frank J Vineis
*Assistant Examiner* — Nicole T Gugliotta
(74) *Attorney, Agent, or Firm* — Oblon, McClelland, Maier & Neustadt, L.L.P.

(57) ABSTRACT

An oil-resistant film may be provided by an oil-resistant base material that is excellent in the oil resistance even in not only a plane part but also a bent part of a package can be obtained and also to the provision of an oil-resistant base material having the oil-resistant film and an oil-resistant paper having the oil-resistant film. An oil-resistant film may contain a polyvinyl alcohol-based polymer (A) and a polymer particle (B) containing a polymer having a glass transition temperature of 40° C. or lower, wherein the content of the polymer particle (B) is 1 part by mass or more and less than 150 parts by mass based on 100 parts by mass of the polyvinyl alcohol-based polymer (A); and an oil-resistant base material (oil-resistant paper) having the oil-resistant film on a base material (paper).

11 Claims, 3 Drawing Sheets

(51) Int. Cl.
   *D21H 19/22*   (2006.01)
   *D21H 21/16*   (2006.01)
(52) U.S. Cl.
   CPC ........ *C08J 2329/04* (2013.01); *C08J 2423/08* (2013.01); *C08J 2425/10* (2013.01); *C08J 2425/14* (2013.01); *C08J 2431/04* (2013.01); *C08J 2433/08* (2013.01); *C08J 2447/00* (2013.01); *C08L 2203/16* (2013.01); *C08L 2205/14* (2013.01)

(56) References Cited

U.S. PATENT DOCUMENTS

| | | | |
|---|---|---|---|
| 5,565,509 | A | 10/1996 | Nguyen et al. |
| 5,667,885 | A | 9/1997 | Nguyen et al. |
| 2012/0157627 | A1* | 6/2012 | Shibutani ............... C08L 29/04 525/57 |
| 2012/0328866 | A1* | 12/2012 | Inoue ........................ C08J 5/18 428/220 |
| 2014/0178609 | A1 | 6/2014 | Kawagoe et al. |
| 2017/0268175 | A1 | 9/2017 | Kawagoe et al. |
| 2018/0002457 | A1 | 1/2018 | Tsuji et al. |
| 2018/0094165 | A1 | 4/2018 | Yoon |

FOREIGN PATENT DOCUMENTS

| | | | | |
|---|---|---|---|---|
| JP | | 9-328581 A | 12/1997 | |
| JP | | 2000-328048 A | 11/2000 | |
| JP | | 2002-362015 A | 12/2002 | |
| JP | | 2004-66054 A | 3/2004 | |
| JP | | 2004-176192 A | 6/2004 | |
| JP | | 2006-183221 A | 7/2006 | |
| JP | | 2009-120996 A | 6/2009 | |
| JP | | 2014-25163 A | 2/2014 | |
| JP | | 2014-141750 A | 8/2014 | |
| JP | | 2014-218755 A | 11/2014 | |
| JP | | 2014-218755 A1 * | 11/2014 | ............ D21H 21/14 |
| JP | | 2015-193944 A | 11/2015 | |
| JP | | 2016-124898 A | 7/2016 | |
| JP | | 2016-135932 A | 7/2016 | |
| WO | WO | 2013/015185 A1 | 1/2013 | |
| WO | WO | 2016/104745 A1 | 6/2016 | |
| WO | WO | 2018/062806 A1 | 4/2018 | |

OTHER PUBLICATIONS

Extended European Search Report issued on Nov. 4, 2022 in European Patent Application No. 19898448.6, 11 pages.
Partial Supplementary European Search Report issued Jul. 11, 2022, in corresponding European Patent Application No. 19898448.6, 13 pages.
Unertl W. N.: "Wetting and Spreading of Styrene-Butadiene Latexes on Calcite", Langmuir, vol. 14, No. 8, Apr. 1, 1998, pp. 2201-2207, XP55935899.
Combined Chinese Search Report and Office Action issued Jul. 27, 2022 in Chinese Patent Application No. 201980084667.5, 7 pages.
International Search Report issued on Mar. 17, 2020 in PCT/JP2019/050071 filed on Dec. 20, 2019, 3 pages.

* cited by examiner

GREASE-RESISTANT FILM, GREASE-RESISTANT BASE MATERIAL, AND GREASE-RESISTANT PAPER

CROSS-REFERENCE TO RELATED APPLICATIONS

The present application is the national stage of international application PCT/JP2019/050071, filed on Dec. 20, 2019, and claims the benefit of the filing dates of Japanese Appl. No. 2019-168774 and 2018-240326, respectively filed on Sep. 17, 2019, and Dec. 21, 2018.

TECHNICAL FIELD

The present invention relates to an oil-resistant film, an oil-resistant base material, and an oil-resistant paper.

BACKGROUND ART

Packages to be used on the occasion of providing foods with a large amount of oil, such as fried potatoes and fried chickens, packaging sheets for wrapping butter, etc., and packages, such as cooking papers to be used for baking a bread, a cake, etc., are required to have a function of preventing the oil content from those foods leaking to the outside. In packaging materials for foods or the like, if the oil content contained in the food penetrates into the package and leaks out, oil stains may form on the surface of the package and impair the appearance, or the printed parts on the surface of the package may cause bleeding by oil stains, so that the OCR suitability of barcodes, QR codes (registered trademark), or the like is possibly deteriorated. In addition, there is a problem that oil is transferred to clothes or skin, causing pollution. In order to solve such a problem, it is known to use a polylaminated paper, such as a polyethylene laminated paper, for a package. However, since it has low moisture permeability and does not pass steam, there is a problem such that when wrapping a warm food, it becomes stuffy and swollen. In addition, for paper recycling, it is necessary to use a device that removes the polyethylene film (such as a crusher), but it is difficult to remove polyethylene because it adheres to the device, and the cost of the device is high. In addition, the price of recycled paper has become high, resulting in an obstacle to promoting the use of recycled paper in the market. Therefore, a package using a coating agent that does not need to be removed later has been studied, and for example, a method in which a fluorine-based oil-resistant agent containing a fluorine compound (see, for example, PTL 1) is attached to the surface or inside of the package has been proposed.

In the case where a fluorine-based oil-resistant agent containing a fluorine compound is used in a package, when the package is incinerated, there may be the case where a highly corrosive gas, such as a hydrogen fluoride gas, and an organic gas different from a resin composed of a hydrocarbon are generated. In addition, a fluorine compound and a fluorine-containing organic compound generated by combustion of the fluorine compound are in general hardly decomposable, and there is a concern about environmental load and health damage. Furthermore, the fluorine compound itself is expensive. Accordingly, as for the oil-resistant agent utilized for packages to be used for foods, an oil-resistant agent other than the fluorine-based oil-resistant agent, namely a non-fluorine-based oil-resistant agent is desired.

As for an invention regarding the non-fluorine-based oil-resistant agent, there has hitherto been, for example, proposed, an oil-resistant water-absorptive composition containing an acrylic resin, a film-forming agent, and a water-insoluble cellulose, in which the acrylic resin and the film-forming agent are contained in a proportion of the acrylic resin to the film-forming agent of 90/10 to 40/60 in terms of a weight ratio, and the water-insoluble cellulose is contained in an amount of 0.5 to 5 parts by mass based on 100 parts by mass of the sum total of the acrylic resin and the film-forming agent (see PTL 2).

CITATION LIST

Patent Literature

PTL 1: JP 2009-120996 A
PTL 2: JP 2016-124898 A

SUMMARY OF INVENTION

Technical Problem

However, though a conventional package utilizing a non-fluorine-based oil-resistant agent has a certain level of oil resistance in the plane part, it may not always be sufficient. In addition, the oil-resistant film in the bent part is cracked, and oil easily penetrates therefrom, resulting in oil stains on the bent part and spoiling the appearance, or the oil is transferred to clothes or skin to cause contamination. In particular, in the case where the coating amount of the oil-resistant agent is small, the foregoing problem is liable to be generated. Thus, it was much more difficult to avoid the aforementioned problem while reducing the coating amount of the oil-resistant agent in order to make the moisture permeability required for the food packaging excellent.

On the other hand, there may be considered a method in which by containing a plasticizer, such as glycerin, in the film-forming agent to impart flexibility, the oil-resistant film is hardly cracked even in the bent part. However, since the oil-resistant film is plasticized (reduced in elastic modulus), the oil-resistant film is liable to be thinned in the bent part, the oil readily penetrates thereinto, and the plasticizer is liable to bleed out from the oil-resistant film, thereby possibly causing staining of the clothes or skin.

Now, an object of the present invention is to provide an oil-resistant film from which an oil-resistant base material that is excellent in oil resistance even in not only a plane part but also a bent part in a package is obtained; and also to provide an oil-resistant base material having the oil-resistant film and an oil-resistant paper having the oil-resistant film.

Solution to Problem

The present inventors made extensive and intensive investigations. As a result, they have been found that an oil-resistant film containing predetermined amounts of a polyvinyl alcohol-based polymer and a polymer particle containing a polymer whose glass transition temperature is a predetermined value or less is able to solve the aforementioned problem and made investigations on the basis of the foregoing finding, thereby leading to accomplishment of the present invention.

Specifically, the present invention is as follows.

[1] An oil-resistant film containing a polyvinyl alcohol-based polymer (A) and a polymer particle (B) containing a polymer having a glass transition temperature of 40° C. or lower, wherein the content of the polymer particle (B) is 1 part by mass or more and less than 150 parts by mass based on 100 parts by mass of the polyvinyl alcohol-based polymer (A).

[2] The oil-resistant film as set forth above in [1], wherein a number average molecular weight of the polymer particle (B) is 5,000 or more.

[3] The oil-resistant film as set forth above in [1] or [2], wherein an average particle diameter of the polymer particle (B) is 10 to 500 nm.

[4] The oil-resistant film as set forth above in any of [1] to [3], wherein the polymer particle (B) is a (meth)acrylic acid ester-based polymer particle.

[5] The oil-resistant film as set forth above in any of [1] to [4], wherein the polymer particle (B) is a (meth)acrylic acid ester-based homopolymer particle.

[6] The oil-resistant film as set forth above in any of [1] to [5], wherein the polymer particle (B) contains a dispersant containing an ionic group.

[7] The oil-resistant film as set forth above in [6], wherein the ionic group is at least one selected from the group consisting of an anionic group and a salt of an anionic group.

[8] The oil-resistant film as set forth above in any of [1] to [3], wherein the polymer particle (B) is at least one selected from the group consisting of an aromatic vinyl-based compound/conjugated diene-based compound copolymer particle and a vinyl acetate-based polymer particle.

[9] The oil-resistant film as set forth above in any of [1] to [8], wherein the polyvinyl alcohol-based polymer (A) is unmodified polyvinyl alcohol or a modified polyvinyl alcohol.

[10] The oil-resistant film as set forth above in any of [1] to [9], wherein the polyvinyl alcohol-based polymer (A) is an ethylene-vinyl alcohol copolymer, and the content of an ethylene unit in the ethylene-vinyl alcohol copolymer is 0.5 to 19 mol % relative to all structural units.

[11] The oil-resistant film as set forth above in any of [1] to [10], wherein the oil-resistant film has a phase-separated structure of a sea-island structure, and the polyvinyl alcohol-based polymer (A) constitutes a sea phase, whereas the polymer particle (B) constitutes an island phase.

[12] The oil-resistant film as set forth above in any of [1] to [11], wherein a thickness thereof is 0.1 to 50 μm.

[13] An oil-resistant base material having the oil-resistant film as set forth above in any of [1] to [12] on a base material.

[14] An oil-resistant paper having the oil-resistant film as set forth above in any of [1] to [12] on a paper.

Advantageous Effects of Invention

In accordance with the present invention, it is possible to provide an oil-resistant film from which an oil-resistant base material that is excellent in oil resistance even in not only a plane part but also a bent part of a package is obtained; and also to provide an oil-resistant base material having the oil-resistant film and an oil-resistant paper having the oil-resistant film.

DESCRIPTION OF EMBODIMENTS

Figure 1:
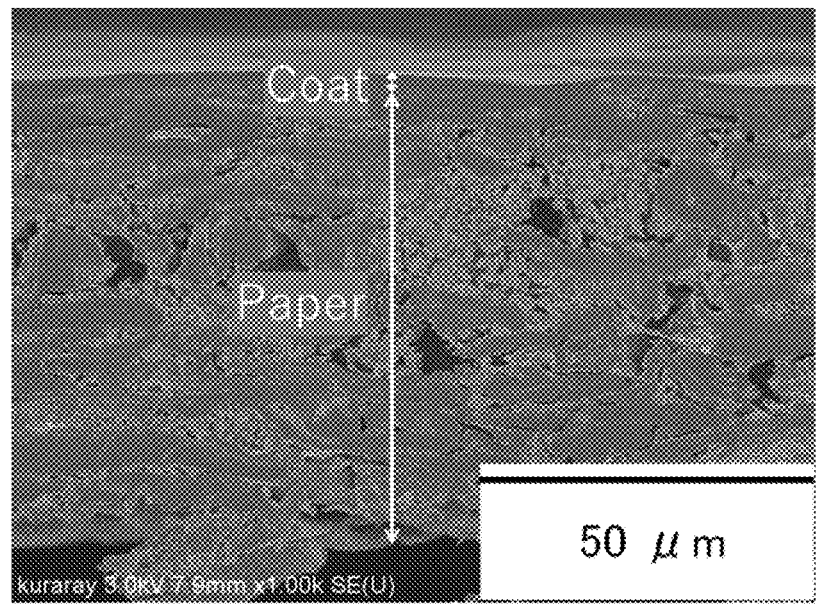
FIG. 1 is a photograph by a scanning electron microscope (SEM) of a cross section of an oil-resistant paper having an oil-resistant film prepared in Example 1 before bending the oil-resistant paper.

The oil-resistant film of the present invention contains predetermined amounts of a polyvinyl alcohol-based polymer (A) and a polymer particle (B) containing a polymer having a glass transition temperature (Tg) of 40° C. or lower. By utilizing the foregoing oil-resistant film, an oil-resistant base material with excellent oil resistance even in not only a plane part but also a bent part in a package is obtained. In this specification, the "polyvinyl alcohol" is occasionally referred to as "PVA", and the "polyvinyl alcohol-based polymer" is occasionally referred to as "PVA-based polymer".

From the viewpoint of effects of the present invention, the total content of the polyvinyl alcohol-based polymer (A) and the polymer particle (B) containing a polymer having a glass transition temperature of 40° C. or lower in the oil-resistant film of the present invention is preferably 50% by mass or more, more preferably 70% by mass or more, and still more preferably 90% by mass or more, and it may be substantially 100% by mass.

In this specification, the "room temperature" indicates 25° C.

The respective components which the oil-resistant film contains are hereunder described in detail in order.

<Polyvinyl Alcohol-Based Polymer (A)>

The polyvinyl alcohol-based polymer (A) [hereinafter occasionally referred to as "PVA-based polymer (A)"] is a polymer having a vinyl alcohol unit, and in some cases, it is a polymer having a vinyl alcohol unit and a vinyl alcohol derivative unit. In this specification, the wording "having xx unit" means "having a structural unit derived from xx". The vinyl alcohol unit is a structural unit connected at a vinyl group site and having a hydroxy group as a side chain thereof. Although the vinyl alcohol derivative unit is not particularly restricted, examples thereof include (1) a structural unit in which the hydroxy group which the vinyl alcohol unit has is converted into an acetoxy group; and (2) a structural unit in which two of the vinyl alcohol units are acetalized. The vinyl alcohol derivative unit may be one in which its structural unit may be derived from the vinyl alcohol unit, or one capable of being converted into vinyl alcohol from the derivative unit, and it is not always meant that the vinyl alcohol derivative unit should be one derived from vinyl alcohol.

Although there is no particular restriction, the PVA-based polymer (A) may also be an ionomer. The ionomer is defined in the same manner as in a general definition, and namely, it means a polymer having an intermolecular crosslinked structure owing to ions or an aggregated structure of molecules. Although the ion is not particularly restricted, examples thereof include a cation of an alkali metal; a cation of an alkaline earth metal; a cation of a transition metal, such as zinc; an organic cation, such as an ammonium ion; and an anion, such as a halide ion.

Examples of the PVA-based polymer (A) include unmodified PVA and a modified PVA. Here, the "unmodified PVA" refers to one obtained through saponification of a homopolymer of a vinyl ester and one obtained through saponification of a copolymer of two or more vinyl esters. In addition, the "modified PVA" refers to PVA obtained through substitution (inclusive of crosslinking) of at least a part of the molecular terminal, main chain, and side chain of the aforementioned unmodified PVA with a reactive group or the like, PVA obtained through saponification of a copolymer of a vinyl ester and other ethylenically unsaturated monomer, or PVA corresponding to the both of them.

As for the aforementioned modified PVA, as mentioned above, the PVA obtained through saponification of a copolymer of a vinyl ester and other ethylenically unsaturated monomer is included; however, in the case of this PVA, it becomes PVA containing at least one "other ethylenically unsaturated monomer" unit as described in the "Production Method of PVA-based Polymer (A)" as mentioned later together with vinyl alcohol unit. Of those, ethylene-modified PVA, PVA modified with a carboxy group or its salt, silicon-modified PVA, acetoacetyl group-modified PVA, diacetone group-modified PVA, maleic anhydride-modified PVA, hydroxy group-modified PVA, and so on are preferred, and ethylene-modified PVA is more preferred. The PVA-based polymer (A) may be used alone or may be used in combination of two or more thereof.

As for the PVA-based polymer (A), among those exemplified above, unmodified PVA and ethylene-modified PVA are preferred from the viewpoint of oil resistance, and though any of unmodified PVA and ethylene-modified PVA are suitable, ethylene-modified PVA is more preferred from the viewpoint of oil resistance and water resistance.

(Ethylene-Modified PVA)

As for the aforementioned ethylene-modified PVA, from the viewpoint of oil resistance and water resistance, an ethylene-vinyl alcohol copolymer is preferred; and from the viewpoint of oil resistance and water resistance and easiness of preparation of an aqueous solution or an aqueous dispersion, it is preferred that the content of an ethylene unit in the ethylene-vinyl alcohol copolymer is 0.5 to 19 mol % relative to all structural units. When the foregoing content is 0.5 mol % or more, the water resistance of the oil-resistant film tends to become favorable, and when it is 19 mol % or less, the preparation of the aqueous solution or aqueous dispersion of the ethylene-vinyl alcohol copolymer tends to become easy.

From the same viewpoint, the content of the ethylene unit in the ethylene-vinyl alcohol copolymer is more preferably 1.5 to 15 mol %, still more preferably 2.0 to 12 mol %, and especially preferably 4.0 to 8.0 mol % relative to all structural units.

The explanation regarding the ethylene-modified PVA can be replaced with the explanation regarding the ethylene-vinyl alcohol copolymer.

The content of the ethylene unit in the ethylene-modified PVA can be determined through $^1$H-NMR measurement. For example, the foregoing content is determined through $^1$H-NMR measurement of an ethylene unit-containing vinyl ester-based copolymer that is a precursor or re-acetified product of the ethylene-modified PVA. In more detail, the vinyl ester-based copolymer is subjected to reprecipitation purification with a mixed liquid of n-hexane and acetone three or more times and then dried under reduced pressure at 80° C. for 3 days, to obtain a vinyl ester-based copolymer for analysis. This is dissolved in DMSO-$d_6$ and measured with a $^1$H-NMR analyzer (for example, at 500 MHz) at 80° C. The content of the ethylene unit is calculated using a peak (4.7 to 5.2 ppm) derived from the main-chain methine of the vinyl ester and peaks (0.8 to 1.6 ppm) derived from the main-chain methine of ethylene, the vinyl ester, and the third component.

The ethylene-modified PVA contains a vinyl alcohol unit and an ethylene unit, and as the case may be, it contains a vinyl ester unit. The ethylene-modified PVA may further contain other monomer unit or may not contain it. Although a compound constituting the other monomer unit is not particularly restricted, examples thereof include α-olefins, such as propylene, 1-butene, isobutene, and 1-hexene; unsaturated acids, such as acrylic acid, methacrylic acid, crotonic acid, maleic acid, maleic anhydride, and itaconic acid, or salts thereof, or monoalkyl esters or dialkyl esters of the aforementioned unsaturated acids; vinyl ethers, such as methyl vinyl ether, ethyl vinyl ether, n-propyl vinyl ether, isopropyl vinyl ether, and n-butyl vinyl ether; hydroxy group-containing vinyl ethers, such as ethylene glycol vinyl ether, 1,3-propanediol vinyl ether, and 1,4-butanediol vinyl ether; allyl ethers, such as allyl acetate, propyl allyl ether, butyl allyl ether, and hexyl allyl ether; oxyalkylene group-containing compounds; vinyl silyl compounds, such as vinyl trimethoxysilane; isopropenyl acetate; hydroxy group-containing α-olefins, such as 3-buten-1-ol, 4-penten-1-ol, 5-hexen-1-ol, 7-octen-1-ol, 9-decen-1-ol, and 3-methyl-3-buten-1-ol; sulfonic acid group-containing compounds derived from ethylene sulfonic acid, allyl sulfonic acid, methallyl sulfonic acid, 2-acrylamido-2-methylpropane sulfonic acid, or the like, or salts thereof; and cationic group-containing compounds derived from vinyloxyethyl trimethylammonium chloride, vinyloxybutyl trimethylammonium chloride, vinyloxyethyl dimethylamine, vinyloxymethyl diethylamine, N-acrylamidomethyl trimethylammonium chloride, 3-(N-methacrylamido)propyl trimethylammonium chloride, N-acrylamidoethyl trimethylammonium chloride, N-acrylamidodimethylamine, allyl trimethylammonium chloride, methaallyl trimethylammonium chloride, dimethyl allylamine, allyl ethylamine, or the like.

In the case where the ethylene-modified PVA contains the other monomer unit, its content is preferably 20 mol % or less, and it may be 5 mol % or less, may be 1 mol % or less, and may be 0.5 mol % or less.

(Viscosity-Average Degree of Polymerization)

A viscosity-average degree of polymerization of the PVA-based polymer (A) [hereinafter occasionally abbreviated as "degree of polymerization"] is preferably 200 to 18,000. The degree of polymerization of the PVA-based polymer (A) is more preferably 300 to 15,000, still more preferably 300 to 10,000, yet still more preferably 300 to 5,000, especially preferably 300 to 3,000, and most preferably 500 to 2,000. In the case where the degree of polymerization of the PVA-based polymer (A) is the aforementioned lower limit value or more, the occurrence of a reduction of the strength as the oil-resistant film or easy penetration into the base material at the time of coating is suppressed, and as a result, the oil resistance tends to be improved. On the other hand, in the case where the degree of polymerization is the aforementioned upper limit value or less, the occurrence of an increase of the solution viscosity is suppressed, so that the moldability tends to be improved.

The degree of polymerization of the PVA-based polymer (A) is a value measured by the method described in JIS K6726 (1994) "3.7 Average degree of polymerization".

(Degree of Saponification)

A degree of saponification of the PVA-based polymer (A) is preferably 50 mol % or more, more preferably 70 mol % or more, still more preferably 85 mol % or more, especially preferably 95 mol % or more, and most preferably 98 mol % or more. An upper limit of the degree of saponification of the PVA-based polymer (A) is not particularly limited, and it may be 100 mol %, and may be 99.8 mol %. When the degree of saponification is 50 mol % or more, the solubility in water becomes favorable, and it tends to become easy to prepare an aqueous solution or aqueous dispersion of the PVA-based polymer (A). By increasing the degree of saponification, the moisture permeability of the PVA-based polymer (A) tends to become high.

The degree of saponification is a value measured by the method described in JIS K6726 (1994) "3.5 Degree of saponification".

(Production Method of PVA-Based Polymer (A))

The production method of the PVA-based polymer (A) is not particularly restricted, and a general production method can be adopted. For example, the PVA-based polymer (A) can be produced by saponifying a polyvinyl ester.

Examples of the polyvinyl ester include (i) a homopolymer of a vinyl ester; (ii) a copolymer of two or more vinyl esters; and (iii) a copolymer of a vinyl ester and other ethylenically unsaturated monomer.

Examples of the vinyl ester include vinyl formate, vinyl acetate, vinyl propionate, vinyl versatate, and vinyl pivalate. Of these, vinyl acetate is preferred from the viewpoint of production cost.

The ethylenically unsaturated monomer is not particularly restricted so far as it is copolymerizable with the vinyl ester, and examples thereof include ethylene, an α-olefin, a halogen-containing monomer, a carboxylic acid-containing monomer and an anhydride thereof, or an ester thereof, a (meth)acrylic acid ester, a vinyl ether, a sulfonic acid group-containing monomer, an amide group-containing monomer, an amino group-containing monomer, a quaternary ammonium base-containing monomer, a silyl group-containing monomer, a hydroxy group-containing monomer, and an acetyl group-containing monomer. Of these, ethylene is preferred as the other ethylenically unsaturated monomer.

The PVA-based polymer (A) may be one obtained by further copolymerizing with another monomer, or may be one obtained by modifying an end of the polymer with a chain transfer agent. Examples of the chain transfer agent include aldehydes, such as acetaldehyde, propionaldehyde, butyl aldehyde, and benzaldehyde; ketones, such as acetone, methyl ethyl ketone, hexanone, and cyclohexanone; mercaptanes, such as 2-hydroxyethanethiol; thiocarboxylic acids, such as thioacetic acid; and halogenated hydrocarbons, such as trichloroethylene and perchloroethylene. Of these, aldehydes and ketones are preferred. In the case of using the chain transfer agent, though its use amount can be determined according to a chain transfer coefficient of the chain transfer agent used and the desired degree of polymerization of the PVA-based polymer (A) and is not particularly restricted, it is preferably 0.1 to 10 parts by mass based on 100 parts by mass of the vinyl ester.

Examples of the polymerization method on the occasion of production of the polyvinyl ester include known methods, such as a block polymerization method, a solution polymerization method, a suspension polymerization method, an emulsion polymerization method, and a dispersion polymerization method. Of these, a solution polymerization method, an emulsion polymerization method, and a dispersion polymerization method are preferred from an industrial viewpoint. In the polymerization operation, any of a batch method, a semi-batch method, and a continuous method can be adopted.

Although a polymerization temperature is not particularly restricted, it is preferably 0 to 150° C., more preferably 20 to 150° C., and still more preferably 30 to 80° C.

By saponifying the thus obtained polyvinyl ester with a saponification catalyst, such as sodium hydroxide, and optionally, subjecting to a step, such as a pulverization step and a drying step, the PVA-based polymer (A) is obtained.

The PVA-based polymer (A) may be used in a state of a solution having been dissolved in water or the like, may be used in a state of a dispersion having been dispersed in water or the like, or may be used in a state where the both are intermingled.

<Polymer Particle (B) Containing a Polymer Having a Glass Transition Temperature (Tg) of 40° C. or Lower>

The oil-resistant film of the present invention contains a polymer particle (B) containing a polymer having a Tg of 40° C. or lower [hereinafter occasionally referred to simply as "polymer particle (B)"] together with the PVA-based polymer (A). The polymer particle (B) may be a polymer having a Tg of 40° C. or lower by itself. The polymer particle (B) may be used alone or may be used in combination of two or more thereof. However, it should be construed that the polymer particle (B) is not the aforementioned PVA-based polymer (A) by itself.

The polymer particle (B) may be a polymer particle of a single-layer type (single particle) or may be a polymer particle of a core-shell type composed of a core and a shell covering at least a part of the core. In the case of a core-shell particle, a polymer having a Tg of 40° C. or lower may be contained in at least one of the core and the shell. In addition, the polymer particle (B) may be an ionomer, and the ionomer is as mentioned above.

The polymer particle (B) containing a polymer having a Tg of 40° C. or lower means that it is rich in flexibility, and when containing the polymer particle (B), a stress generated against the oil-resistant film is dispersed, the oil-resistant film is hardly cracked in the bent part of the package, and in its turn, the oil resistance is improved. In addition, by blending the polymer particle (B) in the PVA-based polymer (A), an elongation rate at break of the obtained oil-resistant film tends to be improved. From the viewpoint of an improvement effect of oil resistance in the bent part of the package, the polymer particle (B) preferably contains a polymer having a Tg of −100 to 40° C., more preferably contains a polymer having a Tg of −100 to 35° C., still more preferably contains a polymer having a Tg of −70 to 20° C., yet still more preferably contains a polymer having a Tg of −70 to 0° C., even yet still more preferably contains a polymer having a Tg of −70 to −10° C., especially preferably contains a polymer having a Tg of −65 to −35° C., and most preferably contains a polymer having a Tg of −60 to −50° C.

Here, in the present invention, the Tg is a value determined according to the method described in the section of Examples.

(Average Particle Diameter)

Although an average particle diameter of the polymer particle (B) is not particularly restricted, it is preferably 10 to 500 nm, more preferably 50 to 400 nm, still more preferably 100 to 350 nm, and yet still more preferably 200 to 300 nm from the viewpoint of a balance between polymerization stability and polymerization rate and the viewpoint of oil resistance. The foregoing average particle diameter may be 10 to 150 nm, may be 20 to 120 nm, may be 50 to 100 nm, and may be 50 to 80 nm. Alternatively, it may be 50 to 300 nm, may be 80 to 300 nm, may be 130 to 280 nm, may be 150 to 280 nm, may be 200 to 280 nm, and may be 200 to 250 nm. The average particle diameter is a median diameter determined by measuring the polymer particle (B) existing in the aqueous dispersion with a dynamic light scattering measuring device according to the method described in the section of Examples. However, the average particle diameter of the polymer particle (B) existing in the oil-resistant film, as determined by observing with a transmission electron microscope (TEM) according to the method described in the section of Examples also tends to become a value substantially the same as the average particle diameter measured by the dynamic light scattering measuring device, and therefore, it is preferred that the average particle diameter in this case falls within the aforementioned range.

While the aforementioned average particle diameter refers to a primary particle diameter of the polymer particle (B), in the case where the polymer particle (B) aggregates in the film to form a secondary particle, a secondary particle diameter of the aggregated particle may be 20 to 15,000 nm, may be 40 to 10,000 nm, may be 100 to 8,000 nm, and may be 160 to 7,500 nm. However, an embodiment in which the polymer particle (B) is not aggregated is preferred from the viewpoint of oil resistance.

(Number Average Molecular Weight (Mn))

From the viewpoint of an improvement effect of oil resistance in the bent part of the package, a number average molecular weight of the polymer particle (B) is preferably 5,000 or more, more preferably 5,000 to 150,000, still more preferably 8,000 to 120,000, yet still more preferably 10,000 to 100,000, and especially preferably 15,000 to 100,000. From the same viewpoint, the number average molecular weight may be 5,000 to 50,000, may be 10,000 to 50,000, may be 15,000 to 50,000, and may be 15,000 to 35,000. Alternatively, it may be 35,000 to 150,000, may be 45,000 to 120,000, and may be 70,000 to 100,000.

Here, the number average molecular weight is a value expressed in terms of standard polystyrene as measured by the gel permeation chromatography (GPC), and in detail, it is a value measured according to the measurement method described in the section of Examples.

The polymer particle (B) may be composed of a homopolymer consisting of one kind of monomer unit or may be composed of a copolymer consisting of plural kinds of monomer units.

From the viewpoint of an improvement effect of oil resistance in the bent part of the package, the polymer particle (B) preferably contains a polymer (B1) containing an ethylenically unsaturated monomer (b1) unit, more preferably contains 50% by mass or more of the polymer (B1) containing the ethylenically unsaturated monomer (b1) unit, still more preferably contains 80% by mass or more of the polymer (B1) containing the ethylenically unsaturated monomer (b1) unit, especially preferably contains 90% by mass or more of the polymer (B1) containing the ethylenically unsaturated monomer (b1) unit, and most preferably contains substantially 100% by mass of the polymer (B1) containing the ethylenically unsaturated monomer (b1) unit, namely the polymer (B1) containing substantially the ethylenically unsaturated monomer (b1) unit.

A proportion of the ethylenically unsaturated monomer (b1) unit contained in the polymer (B1) is preferably 50% by mass or more, more preferably 60% by mass or more, still more preferably 80% by mass or more, yet still more preferably 90% by mass or more, and especially preferably 95% by mass or more.

The polymer particle (B) may contain other polymer than the polymer (B1) as the need arises. Examples of such other polymer include a PVA-based polymer (A), and preferred examples thereof are the same as those described in the aforementioned PVA-based polymer (A). In the case where the polymer particle (B) contains the other polymer, its content is preferably 50% by mass or less, more preferably 40% by mass or less, still more preferably 20% by mass or less, yet still more preferably 10% by mass or less, and especially preferably 5% by mass or less. What no PVA-based polymer is contained in the polymer particle (B) is also one preferred embodiment.

The "ethylenically unsaturated monomer (b1)" is hereinafter occasionally referred to simply as "monomer (b1)". In addition, the "polymer (B1) containing the ethylenically unsaturated monomer (b1) unit" is occasionally referred to simply as "polymer (B1)".

In this specification, the wording "(meth)acrylic" means one or two selected from "acrylic" and "methacrylic". In addition, the "(N-alkyl) (meth)acrylamide" means one or more selected from "(meth)acrylamide" and "N-alkyl (meth)acrylamide", in other words, it is a general name of a compound in which the alkyl group is substituted on the nitrogen atom of the (meth)acrylamide and a compound in which no alkyl group is substituted on the nitrogen atom of the (meth)acrylamide.

(Ethylenically Unsaturated Monomer (B1))

Examples of the monomer (b1) include (meth)acrylic acid and salts thereof, (meth)acrylic acid esters, such as methyl (meth)acrylate, ethyl (meth)acrylate, n-propyl (meth)acrylate, isopropyl (meth)acrylate, n-butyl (meth)acrylate, t-butyl (meth)acrylate, tricyclodecanyl (meth)acrylate, 2-phenoxyethyl (meth)acrylate, 3-(trimethoxysilyl)propyl (meth)acrylate, a hydroxyalkyl (meth)acrylate, an N,N'-dialkylaminoalkyl (meth)acrylate, a tri(meth)acrylic acid ester [for example, trimethylolpropane tri(meth)acrylate], and a tetra(meth)acrylic acid ester [for example, pentaerythritol tetra(meth)acrylate]; (N-alkyl) (meth)acrylamides, such as (meth)acrylamide, N-methyl (meth)acrylamide, and N-ethyl (meth)acrylamide; aromatic vinyl-based compounds, such as styrene, α-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and a halogenated styrene; vinyl cyanide-based compounds, such as acrylonitrile and methacrylonitrile; conjugated diene-based compounds, such as butadiene, isoprene, 2,3-dimethylbutadiene, 2-methyl-3-ethylbutadiene, 1,3-pentadiene, 3-methyl-1,3-pentadiene, 2-ethyl-1,3-pentadiene, 1,3-hexadiene, 2-methyl-1,3-hexadiene, 3,4-dimethyl-1,3-hexadiene, 1,3-heptadiene, 3-methyl-1,3-heptadiene, 1,3-octadiene, cyclopentadiene, chloroprene, myrcene, and farnesene; aliphatic vinyl-based compounds, such as ethylene and isobutylene; esters between an unsaturated monocarboxylic acid and an unsaturated alcohol, such as allyl (meth)acrylate, methallyl (meth)acrylate, allyl cinnamate, methallyl cinnamate, diallyl maleate, diallyl phthalate, diallyl terephthalate, and diallyl isophthalate; diesters between an unsaturated monocarboxylic acid and a glycol, such as ethylene glycol di(meth)acrylate, butanediol di(meth)acrylate, and hexanediol di(meth)acrylate; polyfunctional aromatic vinyls, such as divinylbenzene; and acetic acid vinyl esters, such as vinyl acetate.

The monomer (b1) may be used alone or may be used in combination of two or more thereof.

Among those exemplified above for the monomer (b1), from the viewpoint of an improvement effect of oil resistance in the bent part of the package, (meth)acrylic acid esters, aromatic vinyl-based compounds, conjugated diene-based compounds, aliphatic vinyl-based compounds, and acetic acid vinyl esters are preferred; methyl methacrylate, ethyl acrylate, n-butyl acrylate, t-butyl acrylate, allyl methacrylate, 2-phenoxyethyl acrylate, a trimethacrylic acid ester, 3-(trimethoxysilyl)propyl methacrylate, styrene, butadiene, isoprene, farnesene, ethylene, isobutylene, and vinyl acetate are more preferred; and methyl methacrylate, ethyl methacrylate, n-butyl acrylate, t-butyl acrylate, allyl methacrylate, 2-phenoxyethyl acrylate, a trimethacrylic acid ester (preferably, trimethylolpropane tri(meth)acrylate), 3-(trimethoxysilyl)propyl methacrylate, styrene, butadiene, ethylene, and vinyl acetate are still more preferred.

As for the monomer (b1), from the viewpoint of an improvement effect of oil resistance in the bent part of the package, an embodiment (i) in which n-butyl acrylate is used alone is also preferred; an embodiment (ii) in which n-butyl acrylate, allyl methacrylate, and trimethylolpropane tri (meth)acrylate are used in combination is also preferred; an embodiment (iii) in which n-butyl acrylate, methyl methacrylate, and 3-(trimethoxysilyl)propyl methacrylate are used in combination is also preferred; an embodiment (iv) in which n-butyl acrylate and methyl methacrylate are used in combination is also preferred; and an embodiment (v) in which n-butyl acrylate and 3-(trimethoxysilyl)propyl methacrylate are used in combination is also preferred. In addition, as for the monomer (b1), an embodiment (vi) in which an aromatic vinyl-based compound and a conjugated diene-based compound are used in combination is also preferred; an embodiment (vii) in which an aromatic vinyl-based compound and a (meth)acrylic acid ester are used in combination is also preferred; and an embodiment (viii) in which an aliphatic vinyl-based compound and an acetic acid vinyl ester are used in combination is also preferred.

Here, when the monomer (b1) is a (meth)acrylic acid ester, the polymer particle (B) is referred to as "(meth) acrylic acid ester-based polymer particle", and in particular, when the (meth)acrylic acid ester is only one kind, the polymer particle (B) is referred to as "(meth)acrylic acid ester-based homopolymer particle".

From the viewpoint of oil resistance of the plane part and an improvement effect of oil resistance in the bent part of the package and in particular, the viewpoint of an improvement effect of oil resistance in the bent part of the package, the polymer particle (B) is also preferably a (meth)acrylic acid ester-based polymer particle [inclusive of an aromatic vinyl-based compound]/(meth)acrylic acid ester copolymer particle] and is also preferably a (meth)acrylic acid ester-based homopolymer particle. In addition, from the viewpoint of oil resistance of the plane part of the package and an improvement effect of oil resistance in the bent part of the package, the polymer particle (B) is also preferably at least one selected from the group consisting of an aromatic vinyl-based compound/conjugated diene-based compound copolymer particle and a vinyl acetate-based polymer particle (more preferably, an aliphatic vinyl-based compound/vinyl acetate copolymer particle).

From the viewpoint of an improvement effect of oil resistance in the bent part of the package, the polymer particle (B) is preferably a single-layered polymer particle. The polymer particle (B) may contain a dispersant to be used on the occasion of production. In more detail, at least a part of the polymer particle (B) may be covered with the dispersant, or the whole thereof may be covered with the dispersant. In the case where the polymer particle (B) is of a single layer, it should be construed that even the state of containing the dispersant as mentioned above is considered to be a single layer.

From the viewpoint of oil resistance and in particular, the viewpoint of an improvement effect of oil resistance in the bent part of the package and the viewpoint of dispersibility of an emulsion, as mentioned later, the dispersant is preferably a dispersant containing an ionic group. The ionic group is preferably at least one selected from the group consisting of an anionic group and a group composed of a salt of an anionic group, and therefore, the dispersant is more preferably an anionic surfactant. Examples of the anionic group include a sulfonic acid group and a carboxy group. In addition, examples of the salt include a sodium salt.

In particular, in the case where the PVA-based polymer (A) is the ethylene-modified PVA, when the dispersant is a dispersant containing an ionic group, the oil-resistant film in which the aggregation of the polymer particle (B) is effectively suppressed can be formed, thereby leading to a tendency to improve the oil resistance and particularly, to improve the oil resistance in the bent part of the package.

(Content of Polymer Particle (B))

From the viewpoint of an improvement effect of oil resistance in the bent part of the package, the content of the polymer particle (B) is 1 part by mass or more and less than 150 parts by mass based on 100 parts by mass of the PVA-based polymer (A). In addition, from the same viewpoint, the content of the polymer particle (B) is preferably 1 part by mass or more and less than 100 parts by mass, more preferably 1 to 50 parts by mass, still more preferably 2 to 50 parts by mass, especially preferably 3 to 40 parts by mass, and most preferably 20 to 35 parts by mass based on 100 parts by mass of the PVA-based polymer (A).

(Phase-Separated Structure)

The oil-resistant film of the present invention tends to have a phase-separated structure of a sea-island structure. Specifically, the oil-resistant film of the present invention tends to have a sea-island structure in which the PVA-based polymer (A) constitutes a sea phase, whereas the polymer particle (B) constitutes an island phase. It may be conjectured that what the foregoing phase-separated structure is taken contributes to improvements of the oil resistance of the plane part of the package and furthermore, the oil resistance in the bent part of the package.

<Production Method of Polymer Particle (B)>

As for the polymer particle (B), a commercially available product can be used, and it can also be produced.

The polymer particle (B) is not particularly limited with respect to the production method, and for example, it can be produced utilizing an emulsion polymerization method. Examples of a monomer to be provided for the polymerization method include the aforementioned ethylenically unsaturated monomer (b1).

The emulsion polymerization method can be, for example, carried out by heating water containing a dispersant while stirring and adding a polymerization initiator and a monomer.

(Dispersant)

Although the dispersant is not particularly restricted, examples thereof include anionic surfactants, such as a sodium alkylbenzene sulfonate, sodium lauryl sulfate, polyoxyethylene lauryl ether acetate, polyoxyethylene lauryl ether sodium acetate, polyoxyethylene lauryl ether sodium sulfate, a polyoxyalkylene lauryl ether sodium sulfate, sodium di-2-ethylhexyl sulfosuccinate, a higher fatty acid sodium, and a rosin-based soap; nonionic surfactants, such as a polyoxyethylene alkyl ether and nonyl phenol ethoxylate; cationic surfactants, such as distearyl dimethyl ammonium chloride and benzalkonium chloride; and amphoteric surfactants, such as cocamidopropyl betaine and cocamidopropyl hydroxysultaine.

It is also possible to use, as the dispersant, polymer surfactants, such as a PVA-based polymer, an acid-modified polyolefin, a β-naphthalene sulfonic acid formalin condensate salt, and an ethyl (methacrylate) copolymer. As for the PVA-based polymer, the aforementioned PVA-based polymer (A) can be used, and from the viewpoint of polymerization stability and production cost, in particular, unmodified PVA can be preferably used.

In the present invention, from the viewpoint of oil resistance and in particular, an improvement effect of oil resistance in the bent part of the package, the dispersant is preferably a dispersant containing an ionic group. The ionic group is preferably an anionic group or a group composed of a salt thereof, and the aforementioned anionic surfactant is representatively exemplified.

The dispersant may be used alone or may be used in combination of two or more thereof.

The use amount of the dispersant is preferably 0.01 to 40% by mass, and more preferably 0.05 to 30% by mass relative to the dispersion medium.

(Polymerization Initiator)

In the emulsion polymerization method, a radical polymerization initiator can be preferably used as the polymerization initiator.

Examples of the radical polymerization initiator include a persulfate-based polymerization initiator, a peroxide-based polymerization initiator, a water-soluble azo-based polymerization initiator, and an oil-soluble azo-based polymerization initiator. In addition, a redox-based polymerization initiator may be used as the radical polymerization initiator. Of these, a persulfate-based polymerization initiator and a peroxide-based polymerization initiator are preferred. Examples of the persulfate-based polymerization initiator include potassium persulfate, sodium persulfate, and ammonium persulfate. Examples of the peroxide-based polymerization initiator include hydrogen peroxide, t-butyl peroxide, and methyl ethyl ketone peroxide.

The polymerization initiator may be used alone or may be used in combination of two or more thereof.

In the case of using a water-soluble polymerization initiator, it may be added as an aqueous solution thereof, whereas in the case of using a water-sparingly soluble polymerization initiator, it is preferred that a dispersion of the radical polymerization initiator is previously prepared using water and a dispersant and then added. In this case, the dispersant to be used may be the same as or different from that used for the emulsion polymerization.

The use amount of the polymerization initiator is preferably 0.0001 to 1% by mass, more preferably 0.001 to 0.5% by mass, and still more preferably 0.001 to 0.1% by mass relative to the dispersion medium.

In the emulsion polymerization method, from the viewpoint of productivity, a redox-based polymerization initiator may be used. As for the redox-based polymerization initiator, a combination of an organic peroxide and a transition metal salt is preferably used.

Examples of the organic peroxide include benzoyl peroxide, n-propyl peroxycarbonate, t-butyl peroxide, and methyl ethyl ketone peroxide.

Examples of the transition metal salt to be used in combination with the organic peroxide include iron compounds, such as iron(II) sulfate, iron(II) thiosulfate, iron(II) carbonate, iron(II) chloride, iron(II) bromide, iron(II) iodide, iron(II) hydroxide, and iron(II) oxide; copper compounds, such as copper(I) sulfate, copper(I) thiosulfate, copper(I) carbonate, copper(I) chloride, copper(I) bromide, copper(I) iodide, copper(I) hydroxide, and copper(I) oxide; and hydrates thereof.

(Reducing Agent)

A reducing agent may be used together with the radical polymerization initiator. Examples of such a reducing agent include iron compounds, such as ferrous chloride and ferrous sulfate; sodium salts, such as sodium hydrogen sulfate, sodium bisulfite, sodium sulfite, sodium hydrogen sulfite, and sodium hydrogen carbonate; and organic reducing agents, such as ascorbic acid, rongalite, sodium dithionite, triethanolamine, glucose, fructose, glyceryl aldehyde, lactose, arabinose, and maltose. Of these, the iron compound and the organic reducing agent may be used in combination.

The use amount of the reducing agent is preferably 0.0001 to 1% by mass, more preferably 0.001 to 0.5% by mass, and still more preferably 0.005 to 0.1% by mass relative to the dispersion medium.

(Crosslinking Agent)

In the emulsion polymerization method, a crosslinking agent may be added as the need arises. Even in the aforementioned monomer (b1), one having a crosslinking performance is occasionally referred to as the crosslinking agent.

As for the crosslinking agent, a bifunctional monomer having two polymerizable groups is suitably used. However, it is also possible to regulate dynamic physical properties and so on by using a polyfunctional monomer having a trifunctional or higher functionality to increase a width of coarseness and fineness of the crosslinking density within the polymer. In the case of using a conjugated diene-based compound, such as butadiene and isoprene, for the whole or a part of the monomer (b1), an unsaturated double bond remains after the polymerization, and therefore, this can be allowed to work as a crosslinking part.

Examples of the crosslinking agent include allyl acrylate, allyl methacrylate, ethylene glycol di(meth)acrylate, triethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, tripropylene glycol di(meth)acrylate, an adduct of (meth)acrylic acid of bisphenol A diglycidyl ether at both ends, pentaerythritol tri(meth)acrylate, pentaerythritol tetra(meth)acrylate, polyester di(meth)acrylate, tris(2-hydroxyethyl)isocyanurate tri(meth)acrylate, tris(2-(2,3-dihydroxypropoxy)ethyl)isocyanurate tri(meth)acrylate, tris(2-hydroxyethyl)isocyanurate di(meth)acrylate, cyclohexane dimethanol di(meth)acrylate, tricyclodecane dimethanol di(meth)acrylate, di(meth)acrylate of a diol which is an adduct of ethylene oxide or propylene oxide of bisphenol A, di(meth)acrylate of a diol which is an adduct of ethylene oxide or propylene oxide of hydrogenated bisphenol A, trimethylolpropane tri(meth)acrylate, and trimethylolpropane trioxyethyl (meth)acrylate. Of these, allyl methacrylate and trimethylolpropane trimethacrylate are preferred.

The crosslinking agent may be used alone or may be used in combination of two or more thereof.

(Grafting Agent)

In the emulsion polymerization method, a grafting agent may be added as the need arises. Even in the aforementioned monomer (b1), one having a grafting performance is occasionally referred to as the grafting agent.

Examples of the grafting agent include maleic acid, maleic anhydride, a metal salt of monoethyl maleate, fumaric acid, a metal salt of monoethyl fumarate, itaconic acid, vinyl benzoate, vinyl phthalate, methacrylic acid, 3-(trimethoxysilyl)propyl methacrylate, maleic acid, and a monoester or diester of fumaric acid or itaconic acid. Examples of the monoester or diester include a methyl monoester, a methyl diester, a propyl monoester, a propyl diester, an isopropyl monoester, an isopropyl diester, a butyl monoester, a butyl diester, an isobutyl monoester, an isobutyl diester, a hexyl monoester, a hexyl diester, a cyclohexyl monoester, a cyclohexyl diester, an octyl monoester, an octyl diester, a 2-ethylhexyl monoester, a 2-ethylhexyl diester, a decyl monoester, a decyl diester, a stearyl monoester, a stearyl diester, a methoxyethyl monoester, a methoxyethyl diester, an ethoxyethyl monoester, an ethoxyethyl diester, a hydroxymonoester, a hydroxydiester, an ethyl monoester, and an ethyl diester.

Among those mentioned above, 3-(trimethoxysilyl)propyl methacrylate is preferred as the grafting agent.

(Metal Ion Chelating Agent)

In the emulsion polymer method, a metal ion chelating agent may be added as the need arises. Specifically, examples thereof include metal ion chelating agents, such as disodium dihydrogen ethylenediaminetetraacetate.

(Thickening Inhibitor)

In the emulsion polymerization method, an electrolyte may be added as a thickening inhibitor within the system of emulsion polymerization as the need arises. Specifically, examples thereof include electrolytes, such as sodium chloride, sodium sulfate, and trisodium phosphate.

In the case of using the dispersant and the thickening inhibitor in combination, though the use amount of the thickening inhibitor is not particularly restricted, it is preferably 20% by mass or less, more preferably 10% by mass or less, and still more preferably 5% by mass or less relative to the dispersant from the viewpoint of stability of a micelle in the dispersion.

As for the aforementioned reducing agent, metal ion chelating agent, and electrolyte, in the case of using them, though they may be added on the way of the polymerization reaction, they are preferably added in water from the beginning of the emulsion polymerization.

(Chain Transfer Agent)

In the emulsion polymerization method, a chain transfer agent may be added as the need arises. In particular, in the present invention, by adding the chain transfer agent, the degree of polymerization can be regulated. Examples of the chain transfer agent include hydrocarbon-based mercaptans, such as n-octyl mercaptan, n-dodecyl mercaptan, t-dodecyl mercaptan, hexadecyl mercaptan, and n-octadecyl mercaptan; thiols (exclusive of the aforementioned hydrocarbon-based mercaptans), such as mercaptoacetic acid, 2-ethylhexyl mercaptoacetate, 3-methoxybutyl mercaptoacetate, β-mercaptopropionic acid, methyl β-mercaptopropionate, 2-ethylhexyl β-mercaptopropionate, 3-methoxybutyl β-mercaptopropionate, 2-mercaptoethanol, and 3-mercapto-1,2-propanediol; and hydrocarbon compounds having a large chain transfer constant, such as an α-methylstyrene dimer.

Of these, hydrocarbon-based mercaptans are preferred, and n-dodecyl mercaptan and t-dodecyl mercaptan are more preferred.

The chain transfer agent may be used alone or may be used in combination of two or more thereof.

In the case of using the chain transfer agent, though its use amount is not particularly restricted, it is preferably 0.01 to 10% by mass, and more preferably 0.1 to 2% by mass relative to the charge amount of the monomer (b1) to be used for production of the polymer particle (B).

(Dispersion Medium)

The dispersion medium is preferably an aqueous medium composed mainly of water. The aqueous medium composed mainly of water may contain a water-soluble organic solvent (e.g., alcohols and ketones) which is soluble in water in an arbitrary proportion. Here, the "aqueous medium composed mainly of water" indicates a dispersion medium containing 50% by mass or more of water. From the viewpoint of production cost and environmental load, the dispersion medium is preferably an aqueous medium containing 90% by mass or more of water, and more preferably water.

The amount of the dispersion medium to be used for the emulsion polymerization method is preferably 50 to 2,000 parts by mass, more preferably 80 to 1,500 parts by mass, and still more preferably 100 to 1,200 parts by mass based on 100 parts by mass of the total amount of the monomer (b1) to be used for production of the polymer particle (B) from the viewpoint of viscosity and stability of the emulsion.

(Anti-Aging Agent)

In the present invention, an anti-aging agent may be added in the dispersion after the emulsion polymerization or in the polymer particle (B) after the recovery treatment or purification treatment from the viewpoint of suppressing the degradation of the polymer particle (B). As for the anti-aging agent, from the viewpoint of suppressing degradation in the recovery treatment or purification treatment of the polymer particle (B) after the polymerization reaction, after adding the anti-aging agent in the dispersion after the emulsion polymerization, the polymer particle (B) may be subjected to a recovery treatment or a purification treatment.

As for the anti-aging agent, general materials can be used.

Specifically, examples of the anti-aging agent include phenol-based compounds, such as hydroquinone, hydroquinone monomethyl ether, 2,5-di-t-butylphenol, 2,6-di(t-butyl)-4-methylphenol, and mono-(or di- or tri-)(α-methylbenzyl)phenol; bisphenol-based compounds, such as 2,2'-methylenebis(4-methyl-6-t-butylphenol), 4,4'-butylidenebis(3-methyl-6-t-butylphenol), and 4,4'-thiobis(3-methyl-6-t-butylphenol); benzimidazole-based compounds, such as 2-mercaptobenzimidazole and 2-mercaptomethylbenzimidazole; amine-ketone-based compounds, such as 6-ethoxy-1,2-dihydro-2,2,4-trimethylquinoline, a reaction product between diphenylamine and acetone, and 2,2,4-trimethyl-1,2-dihydroquinoline polymer; aromatic secondary amine-based compounds, such as N-phenyl-1-naphtylamine, an alkylated diphenylamine, octylated diphenylamine, 4,4'-bis(α,α-dimethylbenzyl)diphenylamine, p-(p-toluenesulfonylamido)diphenylamine, and N,N'-diphenyl-p-phenylenediamine; and thiourea-based compounds, such as 1,3-bis(dimethylaminopropyl)-2-thiourea and tributylthiourea.

The anti-aging agent may be used alone or may be used in combination of two or more thereof.

(Polymerization Temperature)

In general, a polymerization temperature is preferably 0 to 110° C., and from the viewpoint of increasing a rate of polymerization, it is more preferably 20 to 100° C., and still more preferably 60 to 100° C.

<Other Component than PVA-Based Polymer (A) and Polymer Particle (B)>

The oil-resistant film of the present invention may contain other component than the PVA-based polymer (A) and the polymer particle (B) so long as the effects of the present invention are not hindered. Examples of the other component include a polymer (C) not corresponding to the PVA-based polymer (A) and the polymer particle (B) and an additive (D).

Examples of the polymer (C) include a thermoplastic resin and a thermoplastic elastomer. More specifically, examples thereof include an ionomer, a polyester-based resin, a polystyrene-based resin, a polyamide-based resin, a polyolefin-based resin, a polyvinyl chloride-based resin, a polycarbonate-based resin, an acrylic resin, an ethylene-acrylic acid copolymer, an ethylene-acrylic acid ester copolymer, an ethylene-methacrylic acid copolymer, an ethylene-methacrylic acid ester copolymer, an ethylene-vinyl acetate-based copolymer, a polyvinylidene chloride, a vinyl ester-based resin, a polyester-based elastomer, a polyurethane-based elastomer, and a chlorinated polyolefin. However, all of them are limited to those not corresponding to the PVA-based polymer (A) and the polymer particle (B).

Examples of the additive (D) include a plasticizer, an oxygen absorber, a heat stabilizer, a light stabilizer, an ultraviolet absorber, a coloring agent, an antistatic agent, a surfactant, an antibacterial agent, an antiblocking agent, a filler, and an antiseptic. The additive (D) may be one contained in the oil-resistant film by being added separately from the PVA-based polymer (A) and the polymer particle (B) or may be one which is used on the occasion of production of the PVA-based polymer (A) or the polymer particle (B) and as a result, is contained in the oil-resistant film.

In the case where the oil-resistant film of the present invention contains the aforementioned other component, it is preferred that the effects of the present invention are not hindered, and its content (here, excluding the content of the additive used on the occasion of production of the PVA-based polymer (A) or the polymer particle (B)) is preferably 50% by mass or less, more preferably 30% by mass or less, still more preferably 10% by mass or less, and especially preferably 5% by mass or less. Although a lower limit value of the foregoing content is not particularly restricted, for example, it may be 1% by mass, and may be 3% by amass.

(Preparation Method of Emulsion Containing PVA-Based Polymer (A) and Polymer Particle (B) Containing a Polymer Having a Tg of 40° C. or Lower)

By dispersing a dispersion containing the polymer particle (B) in an aqueous solution of the PVA-based polymer (A), an emulsion is obtained. At this time, the emulsion may be prepared by mixing together with the aforementioned other component after being formed in a state of a dispersion as required.

The solid component amount in the emulsion is preferably 1 to 60% by mass, more preferably 2 to 30% by mass, and still more preferably 3 to 15% by mass. Here, the "solid component amount" in the emulsion means the total mass of the components excluding the dispersion medium among the components constituting the emulsion.

<Production Method of Oil-Resistant Film and Oi-Resistant Base Material>

Although the production method of the oil-resistant film of the present invention is not particularly restricted, by coating an emulsion obtained by dispersing the dispersion containing the polymer particle (B) in the aqueous solution of the PVA-based polymer (A) on the base material using a coating machine or the like as required and then drying it, the oil-resistant film can be formed on the base material, and the oil-resistant base material can be thus produced [coating method]. In addition, the oil-resistant base material can also be produced by coating the aforementioned emulsion on a support and then drying it to form an oil-resistant film, and laminating this on the base material [lamination method].

The oil-resistant film of the present invention may be a non-oriented film, may be a uniaxial oriented film, or may be a biaxial oriented film. However, from the viewpoint of oil resistance in the plane part and the bent part of the package, the oil-resistant film is preferably a non-oriented film.

The oil-resistant film may be provided in a necessary site of the base material, namely a site to which oil resistance is to be given, and it is not always required to provide the oil-resistant film on the entire surface of the base material. For example, in the base material, the oil-resistant film may be provided or may not be provided in a site not coming into contact with the contents, such as foods (for example, the outer surface of the package and a part of the inner surface not coming into contact with the contents).

Although the drying condition at the time of drying in the coating method and the lamination method is not particularly restricted, the drying is performed preferably at 60 to 140° C. for 1 to 10 minutes, and more preferably at 80 to 120° C. for 3 to 8 minutes by a method using hot air, an ultraviolet ray, a heating cylinder, or a combination thereof. Although the coating machine is not particularly restricted, examples thereof include devices, such as a size press, a Sym-Sizer, a gate roll coater, a bar coater, and a curtain coater.

By subjecting the oil-resistant base material after drying to the humidity control and calender treatment, the oil resistance and the water resistance can be more improved. Although the calender treatment condition is not particularly limited, the treatment can be carried out at a roll temperature of room temperature (25° C.) to 100° C. and at a roll linear pressure of 20 to 300 kg/cm.

In the coating method, though the coating amount of the oil-resistant film after drying is not particularly limited, it may be 0.1 to 50 g/m$^2$, may be 0.5 to 30 g/m$^2$, and may be 1.0 to 15 g/m$^2$. The foregoing coating amount is preferably 0.1 to 15 g/m$^2$, more preferably 0.5 to 10 g/m$^2$, still more preferably 1.0 to 8.0 g/m$^2$, still more preferably 2.0 to 8.0 g/m$^2$, especially preferably 2.5 to 6.5 g/m$^2$, and most preferably 3.5 to 6.0 g/m$^2$. When the coating amount of the oil-resistant film is 0.1 g/m$^2$ or more, not only the oil resistance in the plane part of the package is excellent, but also the oil resistance in the bent part of the package tends to be improved. When the coating amount of the oil-resistant film is 50 g/m$^2$ or less, the moisture permeability required for a package for foods tends to be excellent. From the viewpoint of moisture permeability, even when the coating amount of the oil-resistant film is 50 g/m$^2$ or less, such an oil-resistant film is very industrially useful from the standpoint of excellent oil resistance in the plane part and the bent part of the package.

In the lamination method, the thickness of the oil-resistant film is not particular restricted, it may be 0.1 to 50 μm, may be 0.5 to 30 μm, may be 1.0 to 15 μm, and may be 5.5 to 7.5 μm. The thickness of the oil-resistant film is preferably 0.1 to 15 μm, more preferably 0.5 to 10 μm, still more preferably 1.0 to 8.0 μm, especially preferably 3.5 to 8.0 μm, and most preferably 4.5 to 5.5 μm. When the thickness of the oil-resistant film is 0.1 μm or more, not only the oil resistance in the plane part of the package is excellent, but also the oil resistance in the bent part of the package tends to be improved. Even when the thickness of the oil-resistant film is 50 µm or less, such an oil-resistant film is very industrially useful from the standpoint of excellent oil resistance in the plane part and the bent part of the package.

The aforementioned thickness can be considered to be the thickness of the oil-resistant film of the present invention. That is, the thickness of the oil-resistant film of the present invention may be 0.1 to 50 µm, may be 0.5 to 30 µm, may be 1.0 to 15 µm, may be 3.5 to 8 µm, and may be 4.5 to 5.5 µm, and all of these ranges are preferred. However, a part of the oil-resistant film may be penetrated into the base material, and in that case, the thickness of the oil-resistant film remaining on the base material occasionally becomes thinner than the aforementioned thickness.

[Oil-Resistant Base Material and Oil-Resistant Paper]

As mentioned above, by coating the emulsion on the base material and then drying it, an oil-resistant base material having the oil-resistant film on the base material is obtained. Examples of the base material include a paper, a rubber, and a nonwoven fabric. As for the paper, high-quality paper, medium-quality paper, lightly coated paper, coated paper, single-glossy paper, bleached or unbleached kraft paper (acidic paper or neutral paper), or board paper or white board paper to be used for corrugated board, building materials, white cardboard, chip cardboard, or the like, can be used. Although a basis weight of the base material is not particularly limited, in the case of wrapping paper, it is preferably 20 to 150 g/m$^2$, more preferably 30 to 90 g/m$^2$, and still more preferably 55 to 75 g/m$^2$, and in the case of a molded container, such as a box, it is preferably 150 to 500 g/m$^2$.

As for the performance, the performance of the bent part can be improved with respect to not only oil resistance but also solvent resistance, chemical resistance, and gas barrier properties, such as oxygen barrier properties and water vapor barrier properties.

In the case where the base material is a rubber, examples thereof include rubber gloves. In the rubber gloves, when oil or the like to be used during the work penetrates into the rubber gloves, there is a concern that the hands may be contaminated, and the hands become rough. The aforementioned problem of the rubber gloves can be solved by the oil-resistant film of the present invention.

In the case of a package for foods, the base material is often paper, and in this case, an oil-resistant paper having an oil-resistant film on the paper can be obtained.

EXAMPLES

The present invention is hereunder more specially described by reference to Examples and Comparative Examples, but it should be construed that the present invention is not limited to these Examples.

All ion-exchanged waters used in the respective Examples are ion-exchanged water having an electrical conductivity of 0.08×10$^{-4}$ S/m or less.

Various analysis conditions and evaluation methods in the respective Examples are shown below.

(1. Glass Transition Temperature (Tg))

As for the glass transition temperature (hereinafter occasionally abbreviated as Tg) of the polymer contained in the polymer particle, values of respective polymer components described in "Polymer Hand Book (John Wiley & Sons Inc.)" were used.

In the case of a multi-component copolymer contained in the polymer particle, or the case of using a polymer component not described in "Polymer Hand Book (John Wiley & Sons Inc.)", after a solid component was taken out from a solution containing the obtained polymer particle and thoroughly dried, the Tg was determined with a differential scanning calorimeter by the method described in JIS K6240 (2011).

Device: Differential scanning calorimetry analyzer "DSC822" (manufactured by METTLER TOLEDO)

Measurement condition: Temperature rise rate=10° C./min (2. Number Average Molecular Weight of Polymer Particle)

A dispersion of the polymer particle obtained in each of the Examples was completely dried up; subsequently, the obtained solid component was dissolved in tetrahydrofuran (THF) to regulate the solid component amount to 10 mg/mL; and then, a solution from which an insoluble matter had been filtered off with a membrane filter ("13JP020AN, manufactured by Toyo Roshi Kaisha, Ltd.) was measured by the gel permeation chromatography (GPC) under the following condition, thereby calculating the number average molecular weight as expressed in terms of standard polystyrene.

Device: CO-8020, manufactured by Tosoh Corporation

Eluent: THF

Column: Four columns in total of one column of TSK-guardcolumn H$_{HR}$-H (46 mm I.D.×4 cm), manufactured by Tosoh Corporation, two columns of TSKgel GMH$_{HR}$-M (7.8 mm I.D.×30 cm), manufactured by Tosoh Corporation, and one column of TSKgel G2000H$_{HR}$ (7.8 mm I.D.×30 cm), manufactured by Tosoh Corporation, were connected in series.

Column temperature: 40° C.

Detector: RI

Liquid feed amount: 1.0 mL/min (3. Average Particle Diameter of Polymer Particle)

A mixed liquid of 0.1 mL of the dispersion obtained in each of the Examples and 10 mL of ion-exchanged water was measured for particle size distribution of the particle on a volume basis by using a dynamic light scattering measuring device (device name: SZ-100, manufactured by Horiba, Ltd.), and the obtained median diameter was defined as the average particle diameter of the polymer particle.

(4. Dispersibility)

In each of the Examples and Comparative Examples, with respect to the emulsion obtained by mixing using a shaker, after allowing to stand at room temperature for 2 hours, the state was visually observed and evaluated according to the following criteria.

A: A precipitate is not generated, and the dispersibility is excellent.

B: A precipitate is generated, and the dispersibility is poor.

(5. Oil Resistance in Plane Part)

With respect to the oil-resistant paper prepared in each of the Examples and Comparative Examples, the coated surface was measured by the TAPPI UM-557 method (KIT method), and a lowest value was defined as a degree of oil resistance (KIT value) and designated as an index of oil resistance.

In view of the fact that almost all of currently commercially available oil-resistant papers using a fluorine resin have a degree of oil resistance (KIT value) of grade 5 or higher, the degree of oil resistance at which a problem is not caused in the general use is grade 5 or higher, and therefore, the degree of oil resistance is preferably grade 5 or higher, and in applications requiring higher oil resistance, grade 7 or higher is preferred.

(6. Oil Resistance in Bent Part)

With respect to the oil-resistant paper prepared in each of the Examples and Comparative Examples, the evaluation sample was bent in two such that the coated surface was faced inward, and a rubber roll (roll width: 45 mm, roll diameter: 92 mm, roll mass: 2 kg, roll hardness: 80 Hs) was rolled in one reciprocation, to provide a fold.

Thereafter, the fold was expanded to put it back, and the degree of oil resistance (KIT value) of the bent part was measured by the TAPPI UM-557 method (KIT method). In view of the fact that with respect to the bent part, the degree of oil resistance at which a problem is not caused is also grade 5 or higher, the degree of oil resistance is preferably grade 5 or higher, and in applications requiring higher oil resistance, grade 7 or higher is preferred, grade 8 or higher is more preferred, grade 10 or higher is still more preferred, and grade 11 or higher is especially preferred.

[Production Example 1] (Production of Ethylene-Modified PVA-1; Ethylene-Vinyl Alcohol Copolymer)

In a pressurized reaction tank equipped with a stirrer, a nitrogen-introducing port, an ethylene-introducing port, and an initiator-adding port, 110.5 of vinyl acetate and 39.1 g of methanol were charged, and after raising the temperature to 60° C., the inside of the system was purged with nitrogen for 30 minutes by means of nitrogen bubbling. Subsequently, ethylene was introduced such that the reaction tank pressure became 0.14 MPa. 2,2'-Azobis(4-methoxy-2,4-dimethyl-valeronitrile) [hereinafter occasionally referred to as "AMV"] as the polymerization initiator was dissolved in methanol to prepare a solution having a concentration of 0.33 g/L, which was then purged with nitrogen by means of bubbling with a nitrogen gas. After regulating the internal temperature of the reaction tank to 60° C., 635.7 mL of the aforementioned initiator solution was injected thereinto, to commence the reaction.

During the polymerization, ethylene was introduced to regulate the reaction tank pressure to 0.61 MPa, the polymerization temperature was kept at 60° C., and AMV was continuously added at a rate of 2.0 L/hr by using the aforementioned initiator solution, to perform the polymerization. After 5 hours, when a polymerization rate became 35%, 2.22 g of sorbic acid was added, followed by cooling to terminate the polymerization.

The reaction tank was opened to remove the ethylene, and then, a nitrogen gas was further bubbled. Subsequently, an unreacted vinyl acetate monomer was removed under reduced pressure, to prepare a methanol solution of ethylene-modified polyvinyl acetate [the polyvinyl acetate will be hereinafter occasionally referred to as "PVAc"]. To 400 g of a methanol solution of ethylene-modified PVAc whose concentration was regulated to 25% by mass by further adding methanol to the methanol solution of the resulting ethylene-modified PVAc (100 g of ethylene-modified PVAc in the solution), 93.0 g of an alkaline solution (methanol solution containing 10% by mass of sodium hydroxide; molar ratio to the vinyl acetate unit in the ethylene-modified PVAc: 0.20) was added, and a saponification reaction was performed at 60° C. After the alkali addition, a gelled material was pulverized with a pulverizer and subjected to a saponification reaction for 1 hour in total. Then, 1,000 g of methyl acetate was added to neutralize the remaining alkali. After confirming the completion of neutralization using a phenolphthalein indicator, the ethylene-modified PVA as a white solid obtained through filtration was added with 1,000 g of methanol, followed by standing and washing at room temperature for 3 hours. After the washing operation was repeated three times, the ethylene-modified PVA obtained through centrifugal dehydration was dried by allowing to stand in a dryer at 70° C. for 2 days. There was thus obtained an ethylene-vinyl alcohol copolymer (referred to as "Ethylene-Modified PVA-1") in which the content of the ethylene unit determined by the following measurement method was 6 mol %, the degree of polymerization was 1,000, the degree of saponification was 99.0 to 99.4 mol %, and the Tg was 70° C.

The aforementioned degree of polymerization was measured by the method described in JIS K6726 (1994) "3.7 Average degree of polymerization".

(Measurement Method of the Content of Ethylene Unit)

The content of the ethylene unit was determined through $^1$H-NMR measurement of the ethylene-modified PVAc that is a precursor of the Ethylene-Modified PVA-1. In more detail, the ethylene-modified PVAc was subjected to reprecipitation purification with a mixed liquid of n-hexane and acetone three times or more and then dried under reduced pressure at 80° C. for 3 days, to obtain the ethylene-modified PVAc for analysis. This was dissolved in DMSO-$d_6$, and the solution was measured with a $^1$H-NMR analyzer (500 MHz) at 80° C. The content of the ethylene unit was determined using a peak (4.7 to 5.2 ppm) derived from the main-chain methine of the vinyl ester and peaks (0.8 to 1.6 ppm) derived from the main-chain methylene of ethylene, the vinyl ester, and the third component.

[Production Example 2] (Production of PVA-2; Unmodified PVA)

In a reaction tank equipped with a stirrer, a nitrogen-introducing port, and an initiator-adding port, 0.59 kg of vinyl acetate and 1.0 kg of methanol were charged, and after raising the temperature to 60° C., the inside of the system was purged with nitrogen for 30 minutes by means of nitrogen bubbling. Subsequently, 2,2'-azobis(isobutyronitrile) (AIBN) as the polymerization initiator was dissolved in methanol to prepare a solution having a concentration of 10% by mass, which was then purged with nitrogen by means of bubbling with a nitrogen gas. After regulating the internal temperature of the reaction tank to 60° C., 10 mL of the aforementioned initiator solution was injected thereinto, to commence the reaction.

After 3 hours, when the degree of polymerization became 50%, 0.1 g of 2,4-diphenyl-4-methyl-1-pentene was added, followed by cooling to terminate the polymerization. The unreacted vinyl acetate monomer was removed to provide a methanol solution of PVAc. To 400 g of a methanol solution of PVAc whose concentration was regulated to 40% by mass by further adding methanol to the resulting methanol solution of PVAc (106 g of PVAc in the solution), 7.44 g of an alkaline solution (methanol solution containing 10% by mass of sodium hydroxide; molar ratio to the vinyl acetate unit in PVAc: 0.01) was added, and a saponification reaction was performed at 40° C. After the alkali addition, a gelled material was pulverized with a pulverizer and subjected to a saponification reaction for 1 hour in total. Then, 1,000 g of methyl acetate was added to neutralize the remaining alkali. After confirming the completion of neutralization using a phenolphthalein indicator, the PVA as a white solid obtained through filtration was added with 1,000 g of methanol, followed by standing and washing at room temperature for 3 hours. After the washing operation was repeated three times, the PVA obtained through centrifugal dehydration was dried by allowing to stand in a dryer at 70° C. for 2 days. There was thus obtained unmodified PVA (referred to as "PVA-2") in which the degree of polymerization was 1,750, and the degree of saponification was 88.4 mol %.

[Production Example 3] (Production of Dispersant I)

3.73 parts by mass of "KAO AKYPO (AKYPO is a registered trademark) RLM100" (main ingredient: polyoxyethylene lauryl ether acetate, manufactured by Kao Corporation) and 41.7 parts by mass of ion-exchanged water were put in a vessel, 0.44 parts by mass of sodium carbonate was charged while stirring, and the contents were thoroughly stirred at room temperature to obtain Dispersion I.

[Production Example 4] (Production of Dispersion II)

Dispersion II was obtained by performing the same operation as in Production Example 3, except for setting the charge amount of "KAO AKYPO (AKYPO is a registered trademark) RLM100" to 50 parts by mass, setting the charge amount of ion-exchanged water to 100 parts by mass, and further changing the sodium carbonate to sodium hydroxide and setting its charge amount to 5.5 parts by mass.

[Production Example 5] (Production of Dispersant I Containing Polymer Particle 1)

Dispersant I obtained in Production Example 3 was put in a reaction vessel equipped with a reflux tube, 255 parts by mass of ion-exchanged water was then added, and the contents were subjected to a deoxidation treatment at room temperature for 30 minutes by bubbling with a nitrogen gas, followed by raising the temperature to 70° C. Thereafter, 3.01 parts by mass of a potassium persulfate aqueous solution obtained by previously dissolving 0.1 parts by mass of potassium persulfate (polymerization initiator) in 30 parts by mass of ion-exchanged water in another vessel and performing a deoxidation treatment by the same method as mentioned above was added.

Subsequently, a solution (dealt with the deoxidation treatment) having n-butyl acrylate (monomer (b1)) and t-dodecyl mercaptan (chain transfer agent) mixed therein was continuously added over 85 minutes by using a feed pump. After completion of the addition, the resultant was kept for 1 hour and then subjected to temperature rise to 90° C. and heated for 2 hours, to obtain Dispersion 1 containing Polymer Particle 1.

The use amounts of the respective reagents are summarized in Table 1. In addition, the number average molecular weight, the average particle diameter, and the Tg of Polymer Particle 1 were determined according to the aforementioned methods. The results are shown in Table 1.

[Production Examples 6 to 14] (Production of Dispersions 2 to 10 Containing Polymer Particles 2 to 10, Respectively)

Dispersions 2 to 10 containing Polymer Particles 2 to 10, respectively were obtained by performing the same operation as in Production Example 5, except for changing the kinds and the use amounts of the respective components as shown in Table 1.

The number average molecular weight, the average particle diameter, and the Tg of each of the obtained Polymer Particles 2 to 10 are shown in Table 1.

[Production Example 15] (Production of Dispersion 11 Containing Polymer Particle 11)

0.1714 parts by mass of PELEX OT-P (ingredient: sodium di-2-ethylhexyl sulfosuccinate, manufactured by Kao Corporation) was put in a reaction vessel equipped with a reflux tube, 174 parts by mass of ion-exchanged water was then added, and the contents were subjected to a deoxidation treatment at room temperature for 30 minutes by bubbling with a nitrogen gas, followed by raising the temperature to 70° C. Thereafter, 0.303 parts by mass of a potassium persulfate aqueous solution (dealt with a deoxidation treatment) prepared by previously dissolving 0.1 parts by mass of potassium persulfate (polymerization initiator) in 10 parts by mass of ion-exchanged water in another vessel was added thereto.

Subsequently, 6.126 parts by mass of a solution (dealt with the deoxidation treatment) having 120 parts by mass of n-butyl acrylate (monomer (b1)), 0.8 parts by mass of n-dodecyl mercaptan (chain transfer agent), and 1.715 parts by mass of the above-treated PELEX OT-P mixed therein was continuously added over 30 minutes by using a feed pump. After completion of the addition, the resultant was kept for 30 minutes. 5.76 parts by mass of the above-prepared potassium persulfate aqueous solution was added thereto, and 116.389 parts by mass of a mixed solution (deal with the deoxidation treatment) of n-butyl acrylate and n-dodecyl mercaptan was continuously added over 4 hours by using a feed pump. After completion of the addition, the resultant was kept for 1 hour and then subjected to temperature rise to 90° C. and heated for 2 hours, to obtain Dispersion 11 containing Polymer Particle 11.

The use amount of each of the reagents, and the number average molecular weight, the average particle diameter, and the Tg of the obtained Polymer Particle 11 are shown in Table 1.

[Production Example 16] (Production of Dispersion 12 Containing Polymer Particle 12)

(Step 1)

In a reaction vessel equipped with a reflux tube, 395 parts by mass of ion-exchanged water and 30 parts by mass of PVA205 (a trade name, manufactured by Kuraray Co., Ltd., polyvinyl alcohol-based polymer, dispersant) were added, and the contents were then subjected to a deoxidation treatment for 30 minutes by bubbling with a nitrogen gas while stirring. The contents were subjected to temperature rise to 70° C. to dissolve the PVA-based resin, thereby obtaining an aqueous solution of the PVA-based resin. To the foregoing aqueous solution, 10 parts by mass of methyl methacrylate (monomer (b1)) and an aqueous solution having 0.05 parts by mass of potassium persulfate (polymerization initiator) dissolved in 5 parts by mass of ion-exchanged water were collectively added.

(Step 2)

At the point of time of confirming the fact that the conversion of the monomer (b1) added in the step 1 exceeded 99% by mass, a monomer mixture (dealt with the deoxidation treatment) composed of 30 parts by mass of n-butyl acrylate (monomer (b1)) and 0.3 parts by mass of 3-(trimethoxysilyl)propyl methacrylate (monomer (b1); grafting agent) was continuously added to the dispersion obtained in the step 1 over 17 minutes. At the point of time of confirming that the conversion of all the monomers exceeded 99% by mass, the polymerization tank was cooled to 25° C. to obtain Dispersion 12 containing Polymer Particle 12 of a core-shell type.

The number average molecular weight, the average particle diameter, and the Tg of the obtained Polymer Particle 12 are shown in Table 1.

[Production Example 17] (Production of Dispersion 13 Containing Polymer Particle 13)

Dispersion 13 containing Polymer Particle 13 of a core-shell type was obtained by performing the same operation as in Production Example 16, except for changing the methyl methacrylate (monomer (b1)) used in the step 1 to n-butyl acrylate (monomer (b1)).

The use amount of each of the reagents, and the number average molecular weight, the average particle diameter, and the Tg of the obtained Polymer Particle 13 are shown in Table 1.

[Production Example 18] (Production of Dispersion 14 Containing Polymer Particle 14)

After putting Dispersion II obtained in Production Example 4 in a reaction vessel equipped with a reflux tube, 192 parts by mass of ion-exchanged water was added, and the contents were subjected to a deoxidation treatment at room temperature for 30 minutes by bubbling with a nitrogen gas, followed by raising the temperature to 70° C. 2.1 parts by mass of a potassium persulfate aqueous solution (dealt with the deoxidation treatment) prepared by previously dissolving 0.1 parts by mass of potassium persulfate (polymerization initiator) in 30 parts by mass of ion-exchanged water in another vessel was added.

Then, a solution (dealt with the deoxidation treatment) having 50 parts by mass of n-butyl acrylate (monomer (b1)) and 0.33 parts by mass of n-dodecyl mercaptan (chain transfer agent) mixed therein was continuously added over 42 minutes by using a feed pump, and after completion of the addition, the resultant was kept for 1 hour. Subsequently, 50 parts by mass of methyl methacrylate (monomer (b1)) (dealt with the deoxidation treatment) was continuously added over 80 minutes by using a feed pump, and after completion of the addition, the resultant was kept for 2 hours. The resultant was further subjected to temperature rise to 90° C. and heated for 2 hours, to obtain Dispersion 14 containing Polymer Particle 14.

The use amount of each of the reagents, and the number average molecular weight, the average particle diameter, and the Tg of the obtained Polymer Particle 14 are shown in Table 1.

[Production Example 19] (Production of Dispersion 15 Containing Polymer Particle 15)

Dispersion 15 containing Polymer Particle 15 was obtained by performing the same operation as in Production Example 15, except for not using the n-dodecyl mercaptan (chain transfer agent).

The number average molecular weight, the average particle diameter, and the Tg of the obtained Polymer Particle 15 are shown in Table 1.

[Production Example 20] (Production of Dispersion 16 Containing Polymer Particle 16)

Dispersion 16 containing Polymer Particle 16 was obtained by performing the same operation as in Production Example 5, except for changing the respective components used and the use amount thereof as shown in Table 1.

The number average molecular weight, the average particle diameter, and the Tg of the obtained Polymer Particle 16 are shown in Table 1.

TABLE 1

| | | Production Example | | | | | | | |
|---|---|---|---|---|---|---|---|---|---|
| | | 5 | 6 | 7 | 8 | 9 | 10 | 11 | 12 |
| Polymer particle No. | | 1 | 2 | 3 | 4 | 5 | 6 | 7 | 8 |
| Dispersion No. | | 1 | 2 | 3 | 4 | 5 | 6 | 7 | 8 |
| Dispersant | Dispersant I | 3.76 | | | | | | | |
| | Dispersant II | | 3.73 | 1.87 | 1.87 | 1.87 | 1.87 | | 0.17 |
| | RLM100NV | | | | | | | | |
| | LATEMUL E-108MB | | | | | | | | |
| | EMAL 2FG | | | | | | | | |
| | PELEX OT-P | | | | | | | 2.54 | |
| | PVA205 | | | | | | | | |
| Chain transfer agent | t-Dodecyl mercaptan | 1.2 | | | | | | | |
| | n-Dodecyl mercaptan | | 1 | 0.63 | 0.36 | 0.18 | | | 0.18 |
| Monomer (b1) | n-Butyl acrylate | 150 | 150 | 75 | 75 | 75 | 75 | 57 | 75 |
| | Ethyl acrylate | | | | | | | | |
| | Allyl methacrylate | | | | | | | 0.6 | |
| | Methyl methacrylate | | | | | | | | |
| | 3-(Trimethoxysilyl) propyl methacrylate | | | | | | | | |
| | Trimethylolpropane trimethacrylate | | | | | | | 0.6 | |

TABLE 1-continued

| | | | | | | | | | |
|---|---|---|---|---|---|---|---|---|---|
| Polymerization initiator | Potassium persulfate | 0.01 | 0.01 | 0.005 | 0.005 | 0.005 | 0.005 | 0.01 | 0.005 |
| Dispersion medium | Ion-exchanged water [1] | 300 | 300 | 150 | 150 | 150 | 150 | 300 | 150 |
| Presence or absence of core-shell structure | | — | — | — | — | — | — | — | — |
| Solid component amount of dispersion [4] (% by mass) | | 31.02 | 33.90 | 33.88 | 34.35 | 33.44 | 32.38 | 27.44 | 26.41 |
| Measurement results | Number average molecular weight | 30,000 | 32,000 | 17,000 | 40,000 | 92,000 | —[2] | —[2] | 95,000 |
| | Average particle diameter [nm] | 93.0 | 92.0 | 117.9 | 89.3 | 91.1 | 113.2 | 85.3 | 134.6 |
| | Tg [°C] | −55 | −55 | −55 | −55 | −55 | −55 | −55 | −55 |

| | | Production Example | | | | | | | |
|---|---|---|---|---|---|---|---|---|---|
| | | 13 | 14 | 15 | 16 | 17 | 18 | 19 | 20 |
| Polymer particle No. | | 9 | 10 | 11 | 12 | 13 | 14 | 15 | 16 |
| Dispersion No. | | 9 | 10 | 11 | 12 | 13 | 14 | 15 | 16 |
| Dispersant | Dispersant I | | | | | | | | |
| | Dispersant II | | | | | | 2.49 | | 1.87 |
| | RLM100NV | | | | | | | | |
| | LATEMUL E-108MB | 1.29 | | | | | | | |
| | EMAL 2FG | | 1.68 | | | | | | |
| | PELEX OT-P | | | 1.32 | | | | 1.32 | |
| | PVA205 | | | | 30 | 30 | | | |
| Chain transfer agent | t-Dodecyl mercaptan | | | | | | | | |
| | n-Dodecyl mercaptan | 0.18 | 0.18 | 0.8 | | | 0.33 | | |
| Monomer (b1) | n-Butyl acrylate | 75 | 75 | 120 | 30 | 40 | 50 | 120 | |
| | Ethyl acrylate | | | | | | | | |
| | Allyl methacrylate | | | | | | | | |
| | Methyl methacrylate | | | | 10 | | 50 | | 75 |
| | 3-(Trimethoxysilyl)propyl methacrylate | | | | 0.3 | 0.3 | | | |
| | Trimethylolpropane trimethacrylate | | | | | | | | |
| Polymerization initiator | Potassium persulfate | 0.005 | 0.005 | 0.006 | 0.05 | 0.05 | 0.007 | 0.006 | 0.005 |
| Dispersion medium | Ion-exchanged water [1] | 150 | 150 | 180 | 400 | 400 | 200 | 180 | 150 |
| Presence or absence of core-shell structure | | — | — | — | Yes | Yes | Yes | — | — |
| Solid component amount of dispersion [4] (% by mass) | | 32.51 | 34.18 | 38.72 | 14.51 | 13.90 | 35.48 | 38.68 | 36.91 |
| Measurement results | Number average molecular weight | 54,000 | 79,000 | 25,000 | —[2] | —[2] | 32,000 (after core polymerization) 75,000 (after shell polymerization) [3] | —[2] | —[2] |
| | Average particle diameter [nm] | 112.8 | 61.4 | 184.9 | 100.6 | 103.5 | 71.4 | 221.2 | 68.6 |
| | Tg [°C] | −55 | −55 | −55 | −55 (core) | −55 (core) | −55 105 (shell) | −55 | 105 |

The unit of the blending amount is parts by mass, and in the case of a solution or a dispersion, it is a mass expressed in terms of a solid component.

[1] Total amount of ion-exchanged water in the dispersion

[2] In the pre-treatment of GPC measurement, the filtration with a membrane filter could not be performed, and therefore, it was impossible to perform the measurement.

[3] After polymerization of methyl methacrylate (shell), only one which could be subjected to filtration with a membrane filter in the pre-treatment of GPC measurement was measured.

[4] The solid component amount of the dispersion was determined in terms of a weight change on the occasion of heating at 140° C. with a heat drying type moisture meter (manufactured by A&D Company, Limited, MX-50).

Here, the respective components described in Table 1 are as follows.

(Dispersant)
  Dispersant I: Dispersion I prepared in Production Example 3, solid component amount=8.1% by mass
  Dispersant II: Dispersion II prepared in Production Example 4, solid component amount=32.2% by mass
  RLM100NV: "KAO AKYPO (AKYPO is a registered trademark) RLM100NV" (a trade name, manufactured by Kao Corporation), polyoxyethylene lauryl ether sodium acetate, solid component amount=24% by mass
  EMAL (registered trademark) 2FG: a trade name, manufactured by Kao Corporation, sodium lauryl sulfate
  LATEMUL (registered trademark) E-108MB: a trade name, manufactured by Kao Corporation, polyoxyethylene polyoxypropylene lauryl ether sodium sulfate, solid component amount=22% by mass
  PELEX (registered trademark) OT-P: a trade name, manufactured by Kao Corporation, sodium di-2-ethyhexyl sulfosuccinate, solid component amount=70% by mass
  PVA205: KURARAY POVAL (registered trademark) PVA205, manufactured by Kuraray Co., Ltd, degree of polymerization=500, degree of saponification=88.2 mol %

(Chain Transfer Agent.)
  t-Dodecyl mercaptan: manufactured by Tokyo Chemical Industry Co., Ltd.
  n-Dodecyl mercaptan: manufactured by Tokyo Chemical Industry Co., Ltd.

(Monomer (b1))
  n-Butyl acrylate: manufactured by Nippon Shokubai Co., Ltd.
  Ethyl acrylate: manufactured by Nippon Shokubai Co., Ltd.
  Allyl methacrylate: manufactured by Tokyo Chemical Industry Co., Ltd.
  Methyl methacrylate: manufactured by Kuraray Co., Ltd.
  3-(Trimethoxysilyl)propyl methacrylate: a grafting agent, manufactured by Tokyo Chemical Industry Co., Ltd.
  Trimethylolpropane trimethacrylate: a crosslinking agent, manufactured by Tokyo Chemical Industry Co., Ltd.

(Polymerization Initiator)
  Potassium persulfate: manufactured by Wako Pure Chemical Industries, Ltd., a radical polymerization initiator (Dispersion Medium)
  Ion-exchanged water: ion-exchanged water having an electrical conductivity of $0.08 \times 10^{-4}$ S/m or less

[Production Example 21] (Production of Ethylene-Modified PVA Aqueous Solution 1)

604.5 parts by mass of ion-exchanged water was put in a vessel equipped with a reflux tube and subjected to temperature rise to 90° C. while stirring with a stirrer at a rotation number of 400 rpm. Subsequently, 45.5 parts by mass of the Ethylene-Modified PVA-1 obtained in Production Example 1 was added and stirred for 120 minutes, followed by allowing to stand for cooling to room temperature to obtain Ethylene-Modified PVA Aqueous Solution 1.

[Production Example 22] (Production of PVA Aqueous Solution 2)

PVA Aqueous Solution 2 was obtained by performing the same operation as in Production Example 21, except for changing the Ethylene-Modified PVA-1 to PVA-2.

[Example 1] Preparation of Emulsion and Preparation of Oil-Resistant Film and Oil-Resistant Paper (Preparation of Emulsion)
In a vessel, the Ethylene-Modified PVA Aqueous Solution 1 prepared in Production Example 21 and the Dispersion 1 prepared in Production Example 5 were put in a blending amount shown in Table 2 and mixed with a shaker at a rotation number of 200 rpm at room temperature for 15 minutes, and the resulting mixture was defoamed with a rotating and revolving mixer for 8 minutes, to obtain an emulsion.

(Preparation of Oil-Resistant Film and Oil-Resistant Paper)
A PET film was placed on a coating machine "K CONTROL COATER" (manufactured by Matsuo Sangyo Co., Ltd.), and a paper of A4 size was further stacked thereon. An OK prince high-quality paper (manufactured by Oji Paper Co., Ltd., basis weight: 64 g/m$^2$) prepared by cutting out in a size of 15 cm×29.7 cm and then measuring for the mass was further stacked thereon. Thereafter, a cover PET film was stacked in a place of 8 cm on the long-side upper part of the OK prince high-quality paper, followed by fixing with a clip. Thereafter, a wire bar No. 30 was set in the coating machine, and the emulsion prepared by the aforementioned method was flowed onto the cover PET film. Subsequently, by moving the wire bar at a rate of 1 m/min, the emulsion was coated on the OK prince high-quality paper, the mass of the coated OH prince high-quality paper was measured here, and the coating amount after drying was calculated. The results are shown in Table 2.

1.5 minutes after completion of coating, the coated OK prince high-quality paper was put in a hot air dryer and dried at 100° C. for 5 minutes, to obtain Oil-Resistant Paper 1 having the oil-resistant film.

Figure 2:
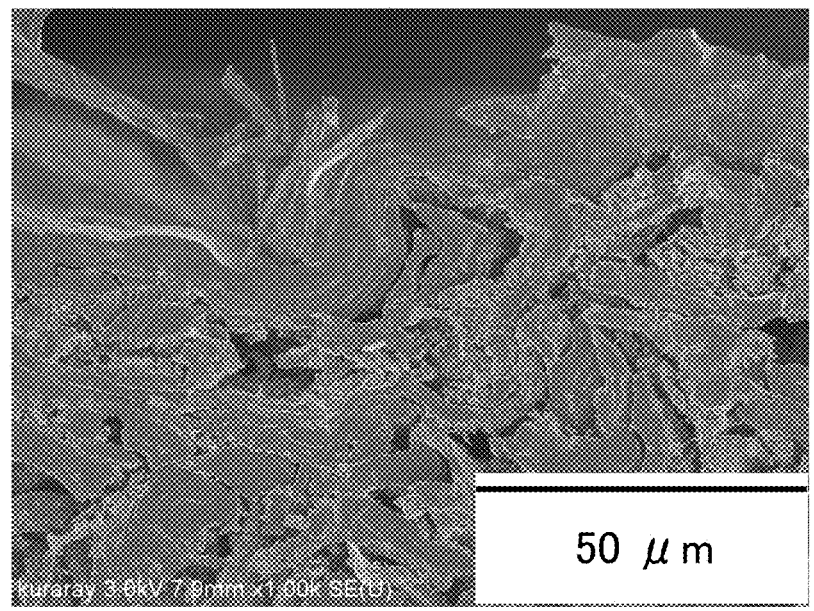
FIG. 2 is a photograph by a scanning electron microscope (SEM) of a cross section of an oil-resistant paper having an oil-resistant film prepared in Example 1 after bending the oil-resistant paper and then returning it to the original state.

The obtained Oil-Resistant Paper 1 was evaluated for the oil resistance according to the aforementioned method. The results are shown in Table 2. In addition, a photograph by a scanning electron microscope (SEM) of a cross section of the Oil-Resistant Paper 1 before bending is shown in FIG. 1, and a photograph by a scanning electron microscope (SEM) of a cross section of the Oil-Resistant Paper 1 after bending and then returning to the original state is shown in FIG. 2.

Figure 3:
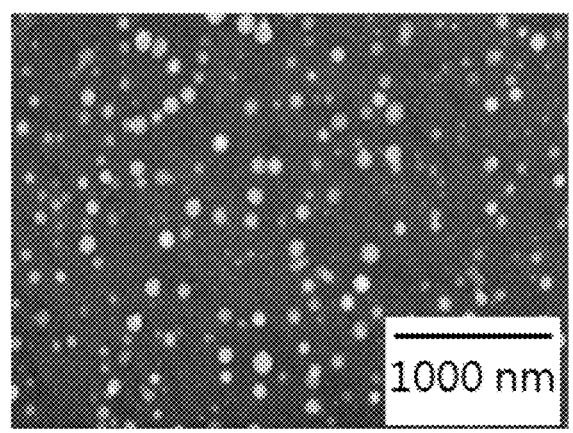
FIG. 3 is a photograph by a transmission electron microscope (TEM) (direct magnification: 10,000 times) of a cast film separately prepared in Example 1 for the purpose of observing a phase-separated structure.
Figure 4:
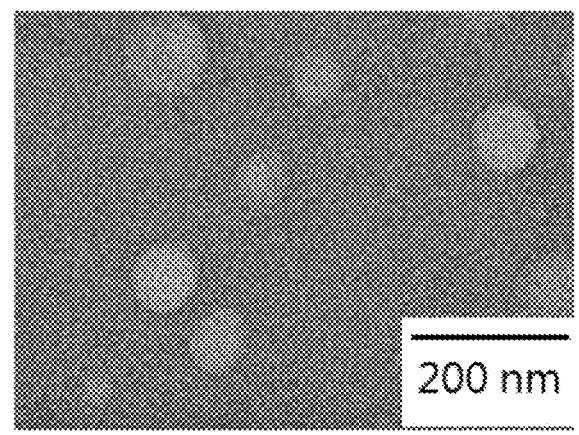
FIG. 4 is a photograph by a transmission electron microscope (TEM) (direct magnification: 50,000 times) of a cast film separately prepared in Example 1 for the purpose of observing a phase-separated structure.

In order to confirm the phase-separated structure of the oil-resistant film of the Oil-Resistant Paper 1, separately, after regulating the emulsion such that the solid component amount was 4% by mass by adding water as required, a cast film was prepared, and this was observed with a transmission electron microscope (TEM). Photographs of the transmission electron microscope (TEM) are shown in FIGS. 3 and 4. A state in which the PVA-based polymer (A) is a sea phase, whereas the polymer particle (B) is an island phase was observed. From the foregoing TEM photographs, the particle diameter of the polymer particle (B) in the oil-resistant film can be measured, and the average particle diameter can also be determined by calculating an average value of the particle diameters of a plural number of particles (for example, 20 particles at random), as the need arises.

[Examples 2 to 28] Preparation of Emulsion and Preparation of Oil-Resistant Film and Oil-Resistant Paper Emulsions were prepared, and Oil-Resistant Papers 2 to 28 each having the oil-resistant film were prepared by performing the same operations as in Example 1, except for changing the PVA aqueous solution and the dispersion used and the use amounts thereof and further the kind of the wire bar and the coating amount as shown in Tables 2 to 4.

The obtained Oil-Resistant Papers 2 to 28 were evaluated for the oil resistance according to the aforementioned method. The results are shown in Tables 2 to 4.

[Comparative Examples 1 to 4] Preparation of Emulsion and Preparation of Oil-Resistant Film and Oil-Resistant Paper Emulsions were prepared, and Comparative Oil-Resistant Papers 1 to 4 each having the oil-resistant film were prepared by performing the same operations as in Example 1, except for changing the PVA aqueous solution and the dispersion used and the use amounts thereof and further the kind of the wire bar and the coating amount as shown in Table 5.

Figure 5:
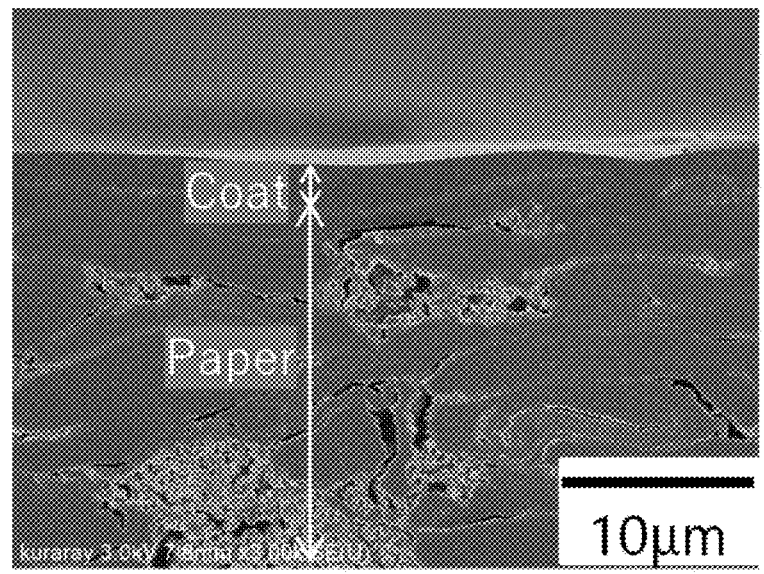
FIG. 5 is a photograph by a scanning electron microscope (SEM) of a cross section of a comparative oil-resistant paper having an oil-resistant film prepared in Comparative Example 1 before bending the oil-resistant paper.
Figure 6:
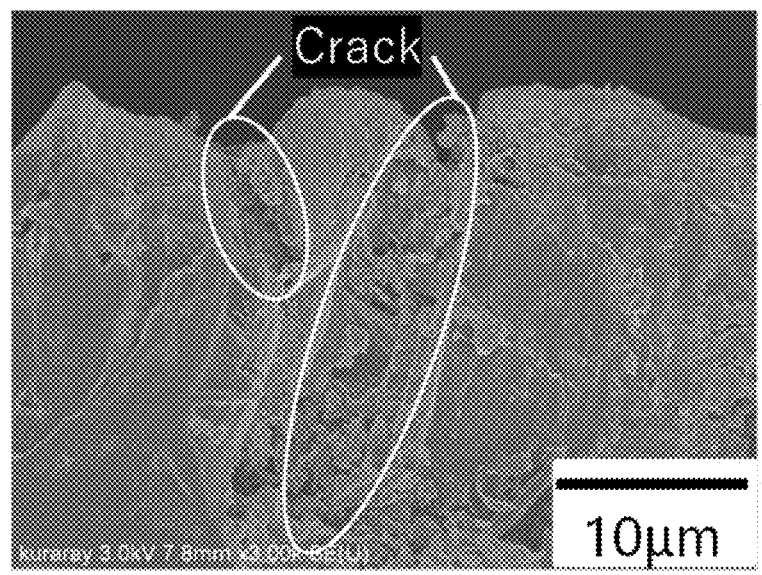
FIG. 6 is a photograph by a scanning electron microscope (SEM) of a cross section of a comparative oil-resistant paper having an oil-resistant film prepared in Comparative Example 1 after bending the oil-resistant paper and then returning it to the original state.

The obtained Comparative Oil-Resistant Papers 1 to 4 were evaluated for the oil resistance according to the aforementioned method. The results are shown in Table 5. In addition, a photograph by a scanning electron microscope (SEM) of a cross section of the Comparative Oil-Resistant Paper 1 before bending is shown in FIG. 5, and a photograph by a scanning electron microscope (SEM) of a cross section of the Comparative Oil-Resistant Paper 1 after bending and then returning to the original state is shown in FIG. 6.

[Comparative Example 5] Preparation of Oil-Resistant Film and Oil-Resistant Paper Comparative Oil-Resistant Paper 5 having an oil-resistant film was obtained by performing the same operation as in Example 1, except for changing the emulsion to AG-E060 (fluorine-based oil-resistant processing agent, manufactured by AGC Inc.) and changing the kind of the wire bar and the coating amount as shown in Table 5.

The obtained Oil-Resistant Paper 5 was evaluated for the oil resistance according to the aforementioned method. The results are shown in Table 5.

TABLE 2

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Emulsion | Ethylene-Modified PVA Aqueous Solution 1 | 5.6 | 5.6 | 5.6 | 5.6 | 5.6 | 5.6 | 5.6 | 5.6 | 5.6 | 5.6 |
|  | PVA Aqueous Solution 2 | | | | | | | | | | |
|  | Dispersion 1 | 0.29 | 1.7 | | | | | | | | |
|  | Dispersion 2 | | | 1.7 | | | | | | | |
|  | Dispersion 3 | | | | 1.7 | | | | | | |
|  | Dispersion 4 | | | | | 1.7 | | | | | |
|  | Dispersion 5 | | | | | | 1.7 | | | | |
|  | Dispersion 6 | | | | | | | 1.7 | | | |
|  | Dispersion 7 | | | | | | | | 1.7 | | |
|  | Dispersion 8 | | | | | | | | | 1.7 | |
|  | Dispersion 9 | | | | | | | | | | 1.7 |
|  | Dispersion 10 | | | | | | | | | | |
|  | Dispersion 11 | | | | | | | | | | |
|  | Dispersion 12 | | | | | | | | | | |
|  | Dispersion 13 | | | | | | | | | | |
|  | Dispersion 14 | | | | | | | | | | |
|  | Dispersion 15 | | | | | | | | | | |
|  | A6160 Aqueous Dispersion | | | | | | | | | | |
|  | A7141 Aqueous Dispersion | | | | | | | | | | |
|  | HERVILLE C-3 | | | | | | | | | | |
|  | HERVILLE B-7 | | | | | | | | | | |
|  | OM-4200NT | | | | | | | | | | |
|  | Dispersion 16 | | | | | | | | | | |
|  | AG-E060 | | | | | | | | | | |
| Addition amount of polymer particle based on 100 parts by mass of PVA [parts by mass] | | 5 | 30 | 30 | 30 | 30 | 30 | 30 | 30 | 30 | 30 |
|  | Dispersibility | A | A | A | A | A | A | A | A | A | A |
|  | Wire bar No. | 30 | 30 | 28 | 28 | 28 | 26 | 28 | 24 | 26 | 26 |
|  | Coating amount [g/m²] | 3 | 4.2 | 5.0 | 5.0 | 5.0 | 5.0 | 5.0 | 5.0 | 5.0 | 5.0 |
| Evaluation results | Degree of oil resistance [KIT value] Plane part | 12 | 7 | 6 | 9 | 9 | 8 | 9 | 12 | 12 | 9 |
|  | Bent part | 5 | 7 | 11 | 8 | 6 | 8 | 8 | 11 | 7 | 7 |

The blending amount is a value expressed in terms of a solid component (unit: parts by mass).

TABLE 3

|  |  | Example | | | | | | | | |
|---|---|---|---|---|---|---|---|---|---|---|
|  |  | 11 | 12 | 13 | 14 | 15 | 16 | 17 | 18 | 19 |
| Emulsion | Ethylene-Modified PVA Aqueous Solution 1 | 5.6 | 5.6 | 5.6 | 5.6 |  | 5.6 | 5.6 | 5.6 | 5.6 |
|  | PVA Aqueous Solution 2 |  |  |  |  | 5.6 |  |  |  |  |
|  | Dispersion 1 |  |  |  |  | 1.7 |  |  |  |  |
|  | Dispersion 2 |  |  |  |  |  |  |  |  |  |
|  | Dispersion 3 |  |  |  |  |  |  |  |  |  |
|  | Dispersion 4 |  |  |  |  |  |  |  |  |  |
|  | Dispersion 5 |  |  |  |  |  |  |  |  |  |
|  | Dispersion 6 |  |  |  |  |  |  |  |  |  |
|  | Dispersion 7 |  |  |  |  |  |  |  |  |  |
|  | Dispersion 8 |  |  |  |  |  |  |  |  |  |
|  | Dispersion 9 |  |  |  |  |  |  |  |  |  |
|  | Dispersion 10 | 1.7 |  |  |  |  |  |  |  |  |
|  | Dispersion 11 |  | 1.7 |  |  |  |  |  |  |  |
|  | Dispersion 12 |  |  | 1.7 |  |  |  |  |  |  |
|  | Dispersion 13 |  |  |  | 1.7 |  |  |  |  |  |
|  | Dispersion 14 |  |  |  |  |  | 1.7 |  |  |  |
|  | Dispersion 15 |  |  |  |  |  |  | 1.7 | 1.4 | 1.1 |
|  | A6160 Aqueous Dispersion |  |  |  |  |  |  |  |  |  |
|  | A7141 Aqueous Dispersion |  |  |  |  |  |  |  |  |  |
|  | HERVILLE C-3 |  |  |  |  |  |  |  |  |  |
|  | HERVILLE B-7 |  |  |  |  |  |  |  |  |  |
|  | OM-4200NT |  |  |  |  |  |  |  |  |  |
|  | Dispersion 16 |  |  |  |  |  |  |  |  |  |
|  | AG-E060 |  |  |  |  |  |  |  |  |  |
| Addition amount of polymer particle based on 100 parts by mass of PVA [parts by mass] | | 30 | 30 | 30 | 30 | 30 | 30 | 30 | 25 | 20 |
|  | Dispersibility | A | A | B | B | B | A | A | A | A |
|  | Wire bar No. | 26 | 26 | 30 | 28 | 28 | 26 | 26 | 26 | 26 |
|  | Coating amount [g/m²] | 5.0 | 5.0 | 5.0 | 5.0 | 5.0 | 5.0 | 5.0 | 5.0 | 5.0 |
| Evaluation results | Degree of oil resistance [KIT value] Plane part | 8 | 11 | 7 | 9 | 12 | 7 | 12 | 12 | 12 |
|  | Bent part | 10 | 10 | 10 | 11 | 11 | 8 | 12 | 12 | 11 |

The blending amount is a value expressed in terms of a solid component (unit: parts by mass).

TABLE 4

|  |  | Example | | | | | | | | |
|---|---|---|---|---|---|---|---|---|---|---|
|  |  | 20 | 21 | 22 | 23 | 24 | 25 | 26 | 27 | 28 |
| Emulsion | Ethylene-Modified PVA Aqueous Solution 1 | 5.6 | 5.6 | 5.6 | 5.6 | 5.6 | 5.6 | 5.6 | 5.6 | 5.6 |
|  | PVA Aqueous Solution 2 |  |  |  |  |  |  |  |  |  |
|  | Dispersion 1 |  |  |  |  |  |  |  |  |  |
|  | Dispersion 2 |  |  |  |  |  |  |  |  |  |
|  | Dispersion 3 |  |  |  |  |  |  |  |  |  |
|  | Dispersion 4 |  |  |  |  |  |  |  |  |  |
|  | Dispersion 5 |  |  |  |  |  |  |  |  |  |
|  | Dispersion 6 |  |  |  |  |  |  |  |  |  |
|  | Dispersion 7 |  |  |  |  |  |  |  |  |  |
|  | Dispersion 8 |  |  |  |  |  |  |  |  |  |
|  | Dispersion 9 |  |  |  |  |  |  |  |  |  |
|  | Dispersion 10 |  |  |  |  |  |  |  |  |  |
|  | Dispersion 11 |  |  |  |  |  |  |  |  |  |
|  | Dispersion 12 |  |  |  |  |  |  |  |  |  |
|  | Dispersion 13 |  |  |  |  |  |  |  |  |  |
|  | Dispersion 14 |  |  |  |  |  |  |  |  |  |
|  | Dispersion 15 | 0.84 | 0.56 | 0.28 | 1.7 |  |  |  |  |  |
|  | A6160 Aqueous Dispersion |  |  |  |  | 1.7 |  |  |  |  |
|  | A7141 Aqueous Dispersion |  |  |  |  |  | 1.7 |  |  |  |
|  | HERVILLE C-3 |  |  |  |  |  |  | 1.7 |  |  |
|  | HERVILLE B-7 |  |  |  |  |  |  |  | 1.7 |  |
|  | OM-4200NT |  |  |  |  |  |  |  |  | 1.7 |
|  | Dispersion 16 |  |  |  |  |  |  |  |  |  |
|  | AG-E060 |  |  |  |  |  |  |  |  |  |

TABLE 4-continued

|  |  | Example | | | | | | | | |
|---|---|---|---|---|---|---|---|---|---|---|
|  |  | 20 | 21 | 22 | 23 | 24 | 25 | 26 | 27 | 28 |
| Addition amount of polymer particle based on 100 parts by mass of PVA [parts by mass] | | 15 | 10 | 5 | 30 | 30 | 30 | 30 | 30 | 30 |
|  | Dispersibility | A | A | A | A | A | A | B | B | A |
|  | Wire bar No. | 28 | 28 | 30 | 18 | 30 | 26 | 24 | 24 | 40 |
|  | Coating amount [g/m²] | 5.0 | 5.3 | 5.0 | 4.0 | 5.0 | 5.0 | 5.0 | 5.0 | 4.6 |
| Evaluation results | Degree of oil resistance [KIT value] Plane part | 12 | 12 | 12 | 12 | 12 | 12 | 12 | 11 | 12 |
|  | Bent part | 11 | 11 | 10 | 10 | 12 | 11 | 10 | 11 | 12 |

The blending amount is a value expressed in terms of a solid component (unit: parts by mass).

TABLE 5

|  |  | Comparative Example | | | | |
|---|---|---|---|---|---|---|
|  |  | 1 | 2 | 3 | 4 | 5 |
| Emulsion | Ethylene-Modified PVA Aqueous Solution 1 | 5.6 | 5.6 | 5.6 | 5.6 |  |
|  | PVA Aqueous Solution 2 |  |  |  |  |  |
|  | Dispersion 1 |  |  |  |  |  |
|  | Dispersion 2 |  |  |  |  |  |
|  | Dispersion 3 |  |  |  |  |  |
|  | Dispersion 4 |  |  |  |  |  |
|  | Dispersion 5 |  |  |  |  |  |
|  | Dispersion 6 |  |  |  | 8.4 |  |
|  | Dispersion 7 |  |  |  |  |  |
|  | Dispersion 8 |  |  |  |  |  |
|  | Dispersion 9 |  |  |  |  |  |
|  | Dispersion 10 |  |  |  |  |  |
|  | Dispersion 11 |  |  |  |  |  |
|  | Dispersion 12 |  |  |  |  |  |
|  | Dispersion 13 |  |  |  |  |  |
|  | Dispersion 14 |  |  |  |  |  |
|  | Dispersion 15 |  |  |  |  |  |
|  | A6160 Aqueous Dispersion |  |  |  |  |  |
|  | A7141 Aqueous Dispersion |  |  |  |  |  |
|  | HERVILLE C-3 |  |  |  |  |  |
|  | HERVILLE B-7 |  |  |  |  |  |
|  | OM-4200NT |  |  |  |  |  |
|  | Dispersion 16 |  |  | 1.7 |  |  |
|  | AG-E060 |  |  |  |  | 7.3 |
| Addition amount of polymer particle based on 100 parts by mass of PVA [parts by mass] | | — | — | 30 | 150 | — |
|  | Dispersibility | — | — | A | B | — |
|  | Wire bar No. | 30 | 30 | 26 | 30 | 12 |
|  | Coating amount [g/m²] | 4.1 | 5.3 | 5.0 | 5.0 | 5.0 |
| Evaluation results | Degree of oil resistance [KIT value] Plane part | 12 | 12 | 12 | 4 | 10 |
|  | Bent part | 3 | 4 | 4 | 4 | <1 |

The blending amount is a value expressed in terms of a solid component (unit: parts by mass).

Here, the respective components described in Tables 2 to 5 are as follows.
(PVA Aqueous Solution)
  Ethylene-Modified PVA Aqueous Solution 1: Ethylene-Modified PVA Aqueous Solution 1 prepared in Production Example 21.
  PVA Aqueous Solution 2: PVA Aqueous Solution 2 prepared in Production Example 22
(Dispersion)
  Dispersions 1 to 16: Dispersions 1 to 16 prepared in Production Examples 5 to 20, respectively
  A6160 Aqueous Dispersion: A 48.3% by mass aqueous dispersion of a styrene-butadiene copolymer particle (Tg: 33° C.), manufactured by Asahi Kasei Corporation was used.
  A71741 Aqueous Dispersion: A 50.2% by mass aqueous dispersion of a styrene-butadiene copolymer particle (Tg: −61° C.), manufactured by Asahi Kasei Corporation was used.
  HERVILLE (registered trademark) C-3: Styrene-acrylic acid ester copolymer particle (Tg: −9° C., 19° C.), manufactured by Dai-Ichi Toryo Mfg., Ltd., 56.0% by mass aqueous dispersion
  HERVILLE (registered trademark) B-7: (Meth)acrylic acid ester-based polymer particle (Tg: −6° C., 16° C.), manufactured by Dai-Ichi Toryo Mfg., Ltd., 42.0% by mass aqueous dispersion
  OM-4200NT: Ethylene-vinyl acetate-based copolymer particle (Tg: 5° C.), manufactured by Kuraray Co., Ltd., 55% by mass aqueous dispersion
  AG-E060: An 8.6% by mass aqueous dispersion of a fluorine-based oil-resistant processing agent, manufactured by AGC Inc. was used.

From Tables 2 to 5, it is noted that the oil-resistant papers prepared in the Examples are excellent not only in the oil resistance in the plane part but also in the oil resistance in the bent part as compared with the oil-resistant papers prepared in the Comparative Examples. It may be conjectured that this is resulted from the fact that as shown in FIGS. 1 and 2, the oil-resistant papers prepared in the Examples are favorable with respect to the state of the bent part of the oil-resistant film even after bending and do not cause cracks or the like, and therefore, the oil resistance in the bent part is excellent. In addition, as for the oil-resistant papers prepared in the Examples, though the bent part is occasionally more excellent in the oil resistance than the plane part, it may be conjectured that this is caused owing to the fact that even when bent, the oil-resistant film does not cause cracks or the like, and therefore, when returning the bent part to the plane state, the oil-resistant film shrank and became thick.

On the other hand, the oil-resistant papers of Comparative Examples 1 and 2 not using the polymer particle and the oil-resistant paper of Comparative Example 3 using the emulsion containing the polymer particle not containing a polymer having a Tg of 40° C. or lower and the oil-resistant paper of Comparative Example 5 using the fluorine-based resin were favorable in the oil resistance in the plane part but poor in the oil resistance in the bent part. It may be conjectured that this is caused owing to the fact that as shown in FIGS. 5 and 6, as for the oil-resistant papers prepared in Comparative Examples 1 to 3 and 5, cracks were caused in the bent part of the oil-resistant film after bending, and the oil became easy to penetrate thereinto. In addition, as for the oil-resistant paper of Comparative Example 4 in which the content of the polymer particle is 150 parts by mass or more based on 100 parts by mass of the polyvinyl alcohol-based polymer (A), both the oil resistance in the plane part and the oil resistance in the bent part are low. It may be conjectured that as for the oil-resistant papers prepared in Comparative Example 4, this is caused owing to the fact that a large amount of the polymer particle having a higher affinity with the oil than the polyvinyl alcohol-based polymer (A) is contained in the oil-resistant film, and therefore, the oil became easy to penetrate into the oil-resistant film.

INDUSTRIAL APPLICABILITY

The oil-resistant film of the present invention exhibits excellent oil resistance in not only the plane part but also the bent part of the package. For that reason, the oil-resistant film of the present invention is useful for wide applications, such as packages to be used on the occasion of providing foods having a large amount of oil, such as fried potatoes and fried chickens, packaging sheets for wrapping butter, etc., and packages, such as cooking papers to be used for baking a bread, a cake, etc., and rubber gloves.

The invention claimed is:

1. An oil-resistant film, comprising:
   (A) a polyvinyl alcohol-based polymer; and
   (B) a polymer particle, which is a (meth)acrylic acid ester-based homopolymer particle, having a glass transition temperature of 40° C. or lower,
   wherein the polyvinyl alcohol-based polymer (A) is unmodified polyvinyl alcohol or modified polyvinyl alcohol,
   wherein the modified polyvinyl alcohol is ethylene-modified polyvinyl alcohol, silicon-modified polyvinyl alcohol, acetoacetyl group-modified polyvinyl alcohol, diacetone group-modified polyvinyl alcohol, or hydroxy group-modified polyvinyl alcohol,
   wherein the ethylene-modified polyvinyl alcohol is ethylene-vinyl alcohol copolymer and the content of an ethylene unit in the ethylene-vinyl alcohol copolymer is 0.5 to 15 mol. % relative to all structural units, and
   wherein the content of the polymer particle (B) is 1 part by mass or more and less than 150 parts by mass based on 100 parts by mass of the polyvinyl alcohol-based polymer (A).

2. The oil-resistant film of claim 1, wherein a number average molecular weight of the polymer particle (B) is 5,000 or more.

3. The oil-resistant film of claim 1, wherein an average particle diameter of the polymer particle (B) is in a range of from 10 to 500 nm.

4. The oil-resistant film of claim 1, wherein the polymer particle (B) further comprises a dispersant comprising an ionic group.

5. The oil-resistant oil film of claim 4, wherein the ionic group is at least one selected from the group consisting of an anionic group and a salt of an anionic group.

6. The oil-resistant film of claim 1, wherein the polymer particle (B) is at least one selected from the group consisting of an aromatic vinyl-based compound/conjugated diene-based compound copolymer particle and a vinyl acetate-based polymer particle.

7. The oil-resistant film of claim 1, wherein the polyvinyl alcohol-based polymer (A) is an ethylene-vinyl alcohol copolymer.

8. The oil-resistant film of claim 1, wherein the oil-resistant film has a phase-separated structure of a sea-island structure, and the polyvinyl alcohol-based polymer (A) constitutes a sea phase, whereas the polymer particle (B) constitutes an island phase.

9. The oil-resistant film of claim 1, wherein a thickness thereof is in a range of from 0.1 to 50 μm.

10. An oil-resistant base material, comprising:
    the oil-resistant film of claim 1 on a base material.

11. An oil-resistant paper, comprising:
    the oil-resistant film of claim 1.

* * * * *